US012209432B2

(12) United States Patent
Pedersen et al.

(10) Patent No.: US 12,209,432 B2
(45) Date of Patent: Jan. 28, 2025

(54) FLUID GUARD AND ABSORBER FOR LOCKING DEVICES

(71) Applicant: Knox Associates, Inc., Phoenix, AZ (US)

(72) Inventors: Jason Shaun Pedersen, Glendale, AZ (US); Dominik Scheffler, Phoenix, AZ (US)

(73) Assignee: Knox Associates, Inc., Phoenix, AZ (US)

( * ) Notice: Subject to any disclaimer, the term of this patent is extended or adjusted under 35 U.S.C. 154(b) by 185 days.

(21) Appl. No.: 17/881,356

(22) Filed: Aug. 4, 2022

(65) Prior Publication Data

US 2023/0044765 A1 Feb. 9, 2023

Related U.S. Application Data

(60) Provisional application No. 63/229,263, filed on Aug. 4, 2021.

(51) Int. Cl.
*E05B 17/14* (2006.01)

(52) U.S. Cl.
CPC .................................. *E05B 17/147* (2013.01)

(58) Field of Classification Search
CPC ........ E05B 17/00; E05B 17/002; E05B 17/14; E05B 17/147; E05B 17/183; E05B 17/185; E05B 17/186; E05B 15/00; E05B 15/029; E05B 67/00; E05B 67/04; E05B 77/00; E05B 77/34
USPC ............................................................ 70/431
See application file for complete search history.

(56) References Cited

U.S. PATENT DOCUMENTS 2,388,228 A 10/1945 Johnstone
2,931,209 A 4/1960 Dies et al.
2,988,910 A * 6/1961 Eshbaugh .......... B60K 15/0409 70/455
3,583,185 A * 6/1971 Jacobi .................. E05B 17/188 70/455
3,625,035 A * 12/1971 Brummer et al. ....... H01H 9/04 70/455
(Continued)

FOREIGN PATENT DOCUMENTS

CN 205243206 U 5/2016
DE 3716370 A1 11/1988
(Continued)

OTHER PUBLICATIONS

International Search Report and Written Opinion for PCT/US2022/074513 mailed on Oct. 28, 2022 in 16 pages.

*Primary Examiner* — Nathan Cumar
(74) *Attorney, Agent, or Firm* — Knobbe, Martens, Olson & Bear, LLP

(57) ABSTRACT

Described herein are example fluid guards that can be used with locking devices. Various aspects may be particularly applicable to electrical locks, but they may also be applicable to mechanical locks. A locking device guard can include a guard cover, a fluid absorber, and a coupling element. The fluid absorber can be configured in a closed configuration to fit at least partially within a cup of a lock face. The coupling element can be configured to couple the guard cover to the lock and can define a second axis. The coupling element can be configured to allow the guard cover to rotate about the second axis.

20 Claims, 30 Drawing Sheets

(56) References Cited

U.S. PATENT DOCUMENTS

| | | | | | |
|---|---|---|---|---|---|
| 3,740,981 | A * | 6/1973 | Patriquin | G09F 3/0323 | 439/142 |
| 3,975,935 | A * | 8/1976 | Masterson | E05B 77/34 | 70/455 |
| 4,023,388 | A * | 5/1977 | Morvai | E05B 17/183 | 70/455 |
| 4,154,072 | A * | 5/1979 | Flaschar | E05B 17/183 | 70/455 |
| 4,262,508 | A * | 4/1981 | Davidson | E05B 77/34 | 16/431 |
| 4,282,732 | A * | 8/1981 | Bennett | E05B 17/183 | 70/455 |
| 6,467,316 | B1 * | 10/2002 | Chen | E05B 67/02 | 70/423 |
| 2004/0055342 | A1 * | 3/2004 | Chen | E05B 17/002 | 70/56 |
| 2019/0301198 | A1 * | 10/2019 | Pedersen | E05B 67/00 | |

FOREIGN PATENT DOCUMENTS

| | | | |
|---|---|---|---|
| DE | 3716384 | A1 | 11/1988 |
| JP | 2009-019469 | | 1/2009 |

* cited by examiner

FLUID GUARD AND ABSORBER FOR LOCKING DEVICES

INCORPORATION BY REFERENCE TO ANY RELATED APPLICATIONS

Any and all applications, if any, for which a foreign or domestic priority claim is identified in the Application Data Sheet of the present application are hereby incorporated by reference under 37 CFR 1.57.

BACKGROUND

Electronic locks have a number of advantages over normal mechanical locks. For example, electronic locks may be encrypted so that only a key carrying the correct code will operate the lock. In addition, an electronic lock may contain a microprocessor so that, for example, a record can be kept of who has operated the lock during a certain time period or so that the lock is only operable at certain times. An electronic lock may also have the advantage that, if a key is lost, the lock may be reprogrammed to prevent the risk of a security breach and to avoid the expense associated with replacement of the entire lock.

SUMMARY

Described herein are example fluid guards that can be used with locking devices. Various aspects may be particularly applicable to electrical locks, but they may also be applicable to mechanical locks. Fluid can adversely impact locks. For example, with electrical or electronic locks, the fluid may disturb electronic communication and other operation, or damage electronic components of the electronic lock. Fluid can also seep into the mechanical lock mechanism and adversely impact operation of the lock mechanism, such as by causing rust or deterioration of the mechanical components.

For purposes of summarizing the disclosure, certain aspects, advantages and novel features are discussed herein. It is to be understood that not necessarily all such aspects, advantages or features will be embodied in any particular embodiment disclosed herein, and a myriad of combinations of such aspects, advantages, or features may be implemented.

A locking device guard can include a guard head, a guard body, and a hinge. The guard head may include a fluid absorber, a frame that is shaped to receive the fluid absorber, and a fastening mechanism. The guard body can be coupled with an electronic lock. The guard body can include an aperture that is configured to expose a face of the electronic lock. The aperture may also receive the fluid absorber. The fluid absorber may contact the face of the electronic lock and to thereby absorb fluid off of the face of the electronic lock. The guard body may further include a fastening receiver that is configured to mate with the fastening mechanism. The hinge can connect the guard head and the guard body and be configured to define an open position and a closed position of the locking device guard.

A locking device guard head can include a fluid absorber. The fluid absorber can be inserted into a cup of a face of a lock. The fluid absorber may also absorb fluid from the face of the lock. The guard head can also include a frame that is shaped to receive the fluid absorber. The guard head can include a fastening mechanism. The locking device guard head can prevent a flow of fluid from an exterior of the guard head to the face of the lock.

A locking device guard can be used on an access panel of an access box. The locking device guard can include a latch of the access panel. The locking device guard may include a guard door, a guard body, and a hinge. The guard door may be attached to the latch of the access panel. The guard door can include a fluid absorber. The guard base may be attached to the access panel of the access box. The guard base can include an aperture and a flange. The aperture may be configured to expose a face of an electronic lock that is disposed within the access panel. The aperture may also be configured to receive the fluid absorber, for example, so as to permit the fluid absorber to contact the face of the electronic lock and to thereby permit absorption of fluid off of the face of the electronic lock. The flange may be disposed at least partially about the aperture. The hinge can connect the guard base and the guard door and be configured to define an open position and a closed position of the locking device guard.

BRIEF DESCRIPTION OF THE DRAWINGS

The following drawings and the associated descriptions are provided to illustrate embodiments of the present disclosure and do not limit the scope of the claims.

DETAILED DESCRIPTION

Figure 1A:
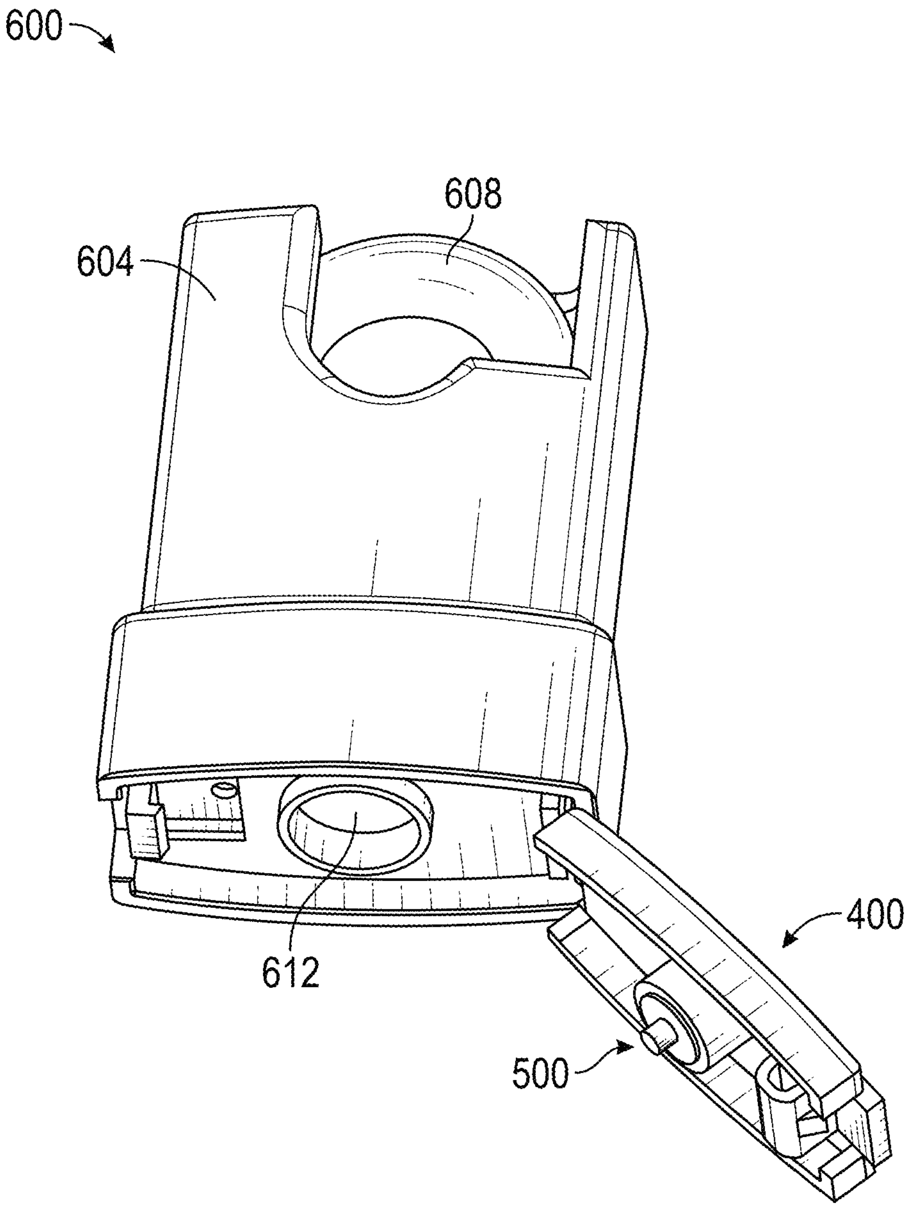
FIG. 1A shows a perspective view of an example lock assembly with a fluid guard in an opened position.

Various structures can be used to cover a lock body. For example, locking devices may include weatherproofing features. In some configurations, one or more seals can be provided on a padlock body and/or on a key. However, many shortcomings exist in the prior art for which the configurations disclosed in this application may provide beneficial and novel solutions.

Described herein are example fluid guards that can be used with locking devices. Various aspects may be particularly applicable to electrical locks, but they also may be applicable to mechanical locks. Electrical or mechanical locks can be used to secure boxes, cabinets, doors, and the like. These locks may be susceptible to problems caused by fluids, such as water, oils, solvents, acids, bases, salts, alcohols, and other fluids containing ketones, salts, glycols, or esters. For example, electronic locking devices may be damaged and/or rendered less effective in the presence of fluids, which can cause short circuits or otherwise disrupt communications. To protect a lock from fluids or other harmful substances, a fluid guard may be used.

A lock can be outfitted with a fluid guard described herein. The fluid guard can prevent or reduce the likelihood of fluids or dust coming into contact with certain parts of the lock, such as an operative face of the lock. Some parts of the lock may be particularly sensitive to changes in physical dimensions, such as at an operative lock face where a key may be inserted or an operative lock face that contacts a key. Repeated exposure to fluid also can be accompanied with an accumulation of rust, debris, microorganisms, and/or a variety of other undesirable effects.

Fluid guards described herein may also improve the functionality of the lock itself. Some electronic locking mechanisms may operate on a principle of inductance or capacitance, and fluid between the operative lock and key components could change the distance between those components and therefore negatively affect communications. For example, an electronic lock may include a partial capacitor comprising a capacitive metal plate in communication with a processor. The capacitive metal plate of the partial capacitor can form a capacitor with a corresponding capacitive metal plate of a key when brought into proximity with the metal plate of the lock, thereby allowing for capacitive data or power transfer between the lock and key. Some examples of such locking mechanisms are disclosed in U.S. Pat. No. 9,710,981, titled "Capacitive Data Transfer in An Electronic Lock and Key Assembly," filed May 5, 2015 ("the '981 patent"), which is incorporated by reference herein in its entirety for all purposes.

Any fluid between these capacitive plates may change the distance between the plates and hence the capacitance, which can limit the ability of the key and lock to communicate effectively or at all. Thus, the fluid guard can be used to prevent or reduce the incidence of fluids covering the capacitive plate of the lock. Further, the fluid guard can include a fluid-absorbent material that can wipe or wick away fluid from the face of the capacitive plate of the lock.

Although certain figures and portions of the following description focus on a fluid guard for an example padlock, it should be understood that the fluid guard can be adapted to protect an electronic or mechanical lock that can be included in a cabinet, enclosure, door or other type of lock. Embodiments that can be incorporated into a cabinet, enclosure, door or the like also have been included. In some configurations, the fluid guard can be used in a mortise lock, for example, but without limitation.

Example Padlock with Fluid Guard

FIG. 1A shows an example lock assembly 600 that includes a lock cover 604, a shackle 608, and a fluid guard 400. The lock assembly 600 may include a plurality of internal components not shown here. For example, the lock assembly 600 may include an electronic lock core (see, for example, FIG. 11). As described herein, electronic lock cores can have a variety of features and functionality that can be implemented in any type of lock, such as a padlock, lockbox, cabinet, door, or the like. Examples of some such locks can be found in the '981 patent incorporated by reference above. The lock assembly 600 may instead include a mechanical lock core. As shown, the example fluid guard 400 can be attached to the lock cover 604 and/or to a body of the lock assembly 600. The fluid guard 400 can include an example fluid absorber 500 that can wipe, absorb, or wick away fluid from a lock face 612 (see also FIG. 1B).

Figure 1B:
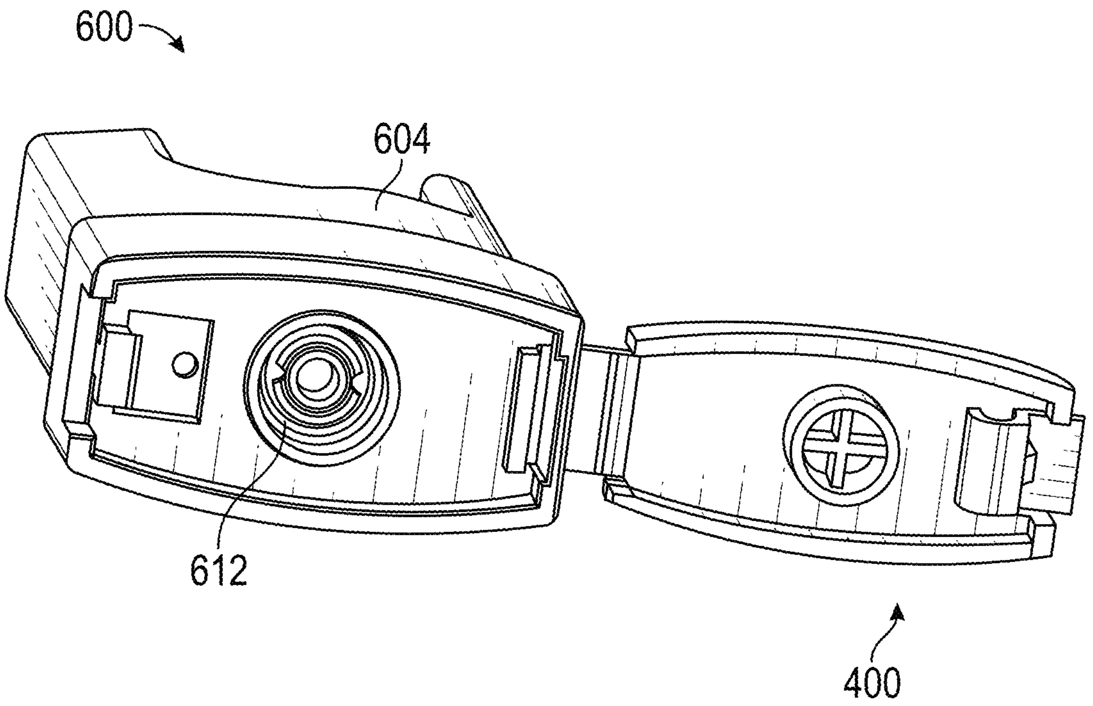
FIG. 1B shows another perspective view of the example lock assembly of FIG. 1A, depicting a lock face and having a fluid absorber removed from the fluid guard.

FIG. 1B shows a perspective view of the example lock assembly of FIG. 1A, including a more detailed view of the example lock face 612. The lock face 612 may include an interface where a key comes in contact with the lock assembly. For example, the lock face 612 can be one end of a lock core. The lock core can be electronic or mechanical. The lock face 612 of the electronic lock core may include a capacitive interface, as described in more detail herein. The fluid absorber 500 is not shown in FIG. 1B (see FIG. 1A). The fluid absorber 500 is described in more detail below.

Figure 2:
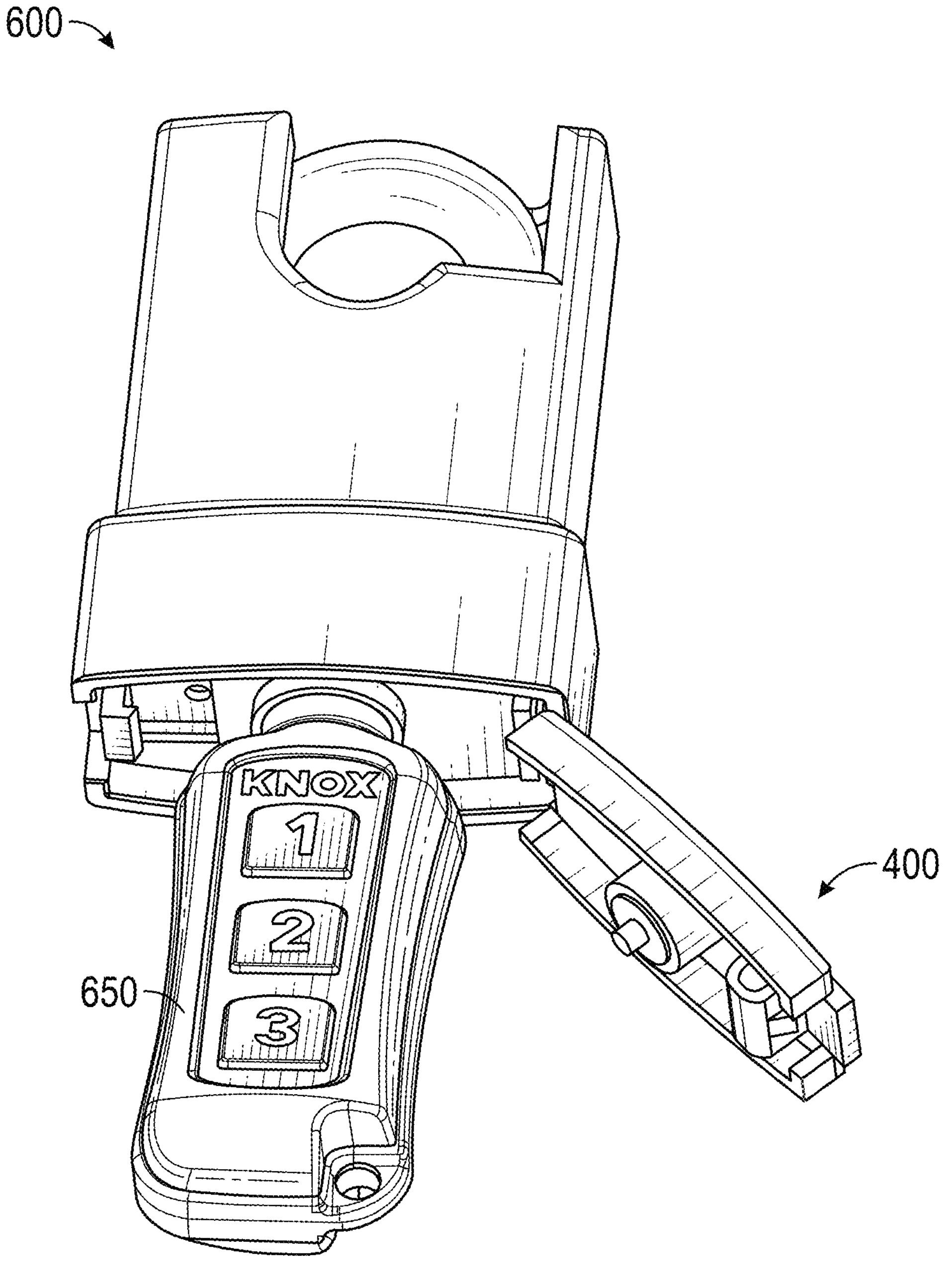
FIG. 2 shows an electronic key connected to the lock assembly of FIG. 1A.

FIG. 2 shows the example embodiment of FIG. 1A where an electronic key 650 has been coupled to the lock assembly 600 and/or is in electrical or electromagnetic communication with the lock assembly 600. Examples of such keys are described in detail, for example, in the '981 patent referred to above. For example, the electronic key 650 may have an electrical induction and/or capacitive mechanism for operating the key-lock combination. When the electronic key 650 engages with the lock assembly 600, certain mechanical operations can occur and certain electrical operations can occur. When engaging the electronic key 650 with the lock assembly 600, the electronic key 650 can be rotationally positioned relative to the lock assembly 600 such that tabs of the electronic key 650 are aligned with corresponding slots of the lock assembly 600 (for example, the slots between the tabs 1470 in FIG. 11). The electronic key 650 may be displaced axially such that the tabs pass through the slots and a cylindrical portion of the electronic key 650 is positioned within a housing of the lock assembly 600. The electronic key 650 can be sized and shaped such that the tabs fit through an opening in the lock assembly 600 fluid guard 400. In this relative position, the electronic key 650 is able to rotate within the housing and relative to the fluid guard 400.

In certain embodiments, when the electronic key 650 engages the lock assembly 600 there are two transfers that occur. The first transfer can be a transfer of power and the second transfer can be a transfer of data. The electronic key 650 may include a partial capacitor comprising a capacitive metal plate in communication with a processor. The capacitive metal plate of the partial capacitor can form a capacitor with a corresponding capacitive metal plate of a lock when brought into proximity with the metal plate of the lock, thereby allowing for capacitive data or power transfer between the key and lock (see FIGS. 10-12). This capacitive data communication can allow for the release of the shackle 608.

As discussed above, however, fluid can interfere with the capacitive functionality described. For example, fluid that interferes with an electronic communication between the lock and the key may hinder the functionality of the key, for example, by altering a capacitance formed between the lock and the key capacitive plates. The fluid guard 400 and fluid absorber 500 can ameliorate this type of problem, among others.

Figure 3:
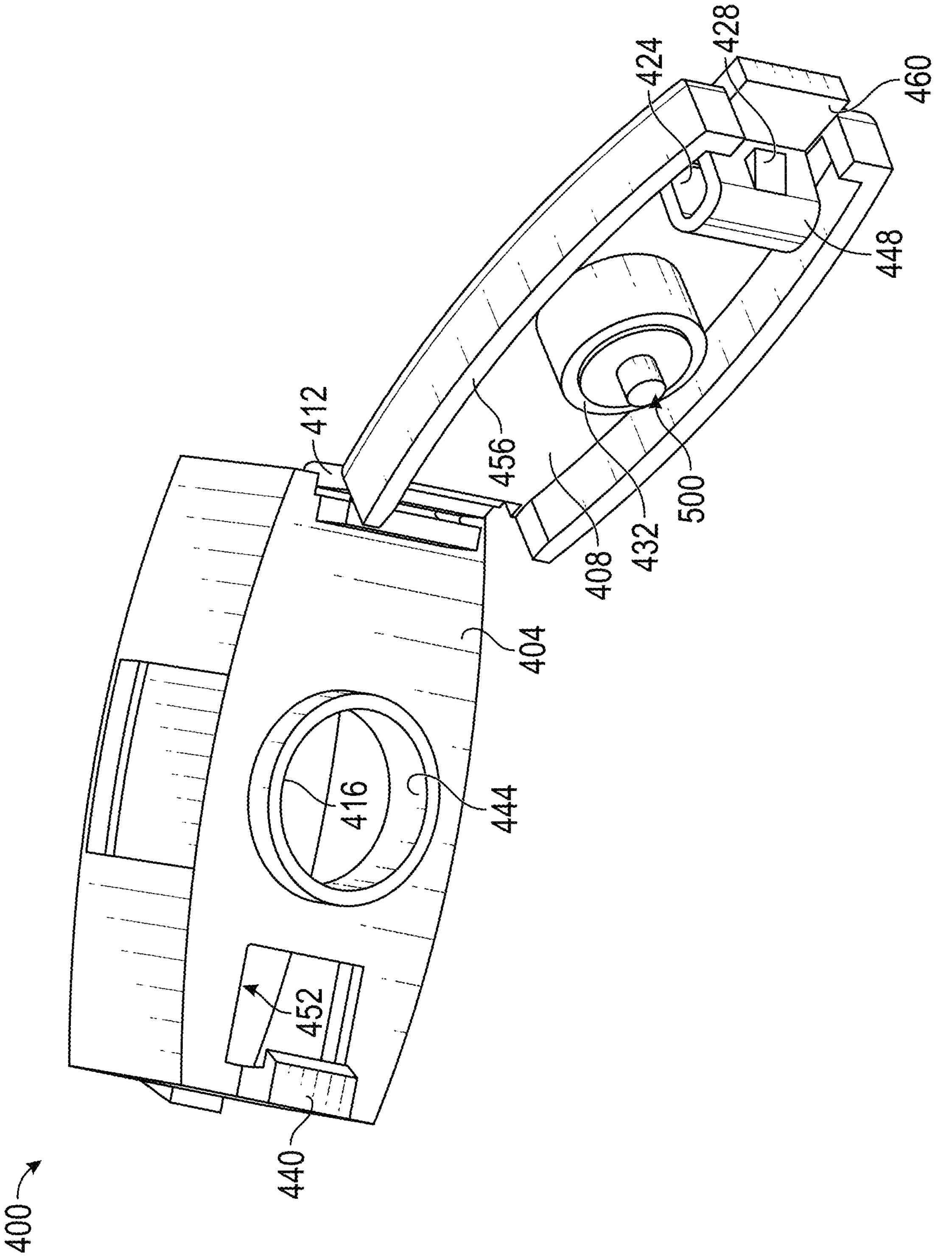
FIG. 3 shows a fluid guard that may be used in a locking assembly.

FIG. 3 shows a more detailed view of the example fluid guard 400 that can be installed on a locking device, such as a mechanical or electronic locking device. The fluid guard 400 together with the fluid absorber 500 can block fluids and/or remove or attenuate fluid interaction with the lock face 612 (FIG. 1B).

As shown in FIG. 3, the fluid guard 400 is in an open position. The fluid guard 400 can include a guard body 404 and a corresponding guard head 408. As shown, for example, the fluid guard 400 may be generally elongate such that a length of the guard body 404 is greater than a width of the guard body 404. In this way, the length may be measured along a major axis and/or the width be measured along a minor axis of the guard body 404. However, the guard body 404 and guard head 408 may be square, oval, round, or otherwise differently shaped than shown here.

One or more sides of the guard body 404 may be rounded, as shown in FIG. 3. A hinge 412 can connect the guard body 404 and the guard head 408. In some embodiments, the hinge 412 defines an axis substantially perpendicular to a direction of insertion of a key (for example, the electronic key 650) and/or parallel to the minor axis. However, in other embodiments, the hinge axis may be parallel to the major axis.

The guard head 408 can be moved from a normally closed position to an open position or can be moved from a normally opened position to a closed position. In some configurations, the guard head 408 is not biased into either position. In the illustrated configuration, to secure the example fluid guard 400 in a closed position, a fastening mechanism 428 on the guard head 408 can mate with (for example, be inserted into, snap fit with, friction fit with, or the like) a corresponding fastening receiver 440. The fastening mechanism 428 can include a cantilevered portion or other ledge (for example, sloped ledge), as shown. The fastening mechanism 428 may be an extension of another portion of the guard head 408, such as a fastening body 448, as shown. In some embodiments, the fastening receiver 440 may include a slot in a portion of the guard body 404. The fastening receiver 440 may be attached to an extension from a surface of the guard body 404, as shown.

Other mechanisms can be used to secure the example fluid guard 400 in a closed position. For instance, the guard head 408 may be secured in a closed position using a friction fit. Additionally or alternatively, a latch mechanism may be used to secure the guard head 408 in a closed position. In some embodiments, a magnet may be inserted into the fluid absorber 500 and/or the guard head 408. A magnetic element (for example, a magnet or a ferrous metal) may be inserted in the guard body 404 to which the magnet may be attracted. In some embodiments, the magnet and the magnetic element location may be swapped. The magnetic configuration can be used to encourage the guard head 408 to remain in a closed position.

One or more components of the fluid guard 400 may include a resilient material. The resilient material may include, for example, a synthetic material such as a synthetic polymer (for example, a synthetic elastomer, a synthetic plastic, etc.). For example, the resilient material of the fluid guard 400 may comprise silicone. Additionally or alternatively, the resilient material may include a natural material, such as a polymer of organic compound(s). The material of the fluid guard 400 can have a durometer of between about 10 and 50. In some embodiments, the durometer may be between about 20 and 40. Preferably, the durometer may be between about 25 and 35. For example, the durometer may be about 30 in certain embodiments. A durometer in one of these ranges may be soft enough to enable an interference fit or friction fit between the guard head and the guard body so as to further resist fluid entry.

The fastening mechanism 428 may be disposed near a distal end of the guard head 408. Distal and proximal may refer to relationships to the hinge 412. Similarly, the fastening receiver 440 may be located at or near a distal end of the guard body 404, as shown. The fastening body 448 may include a protrusion from the guard head 408. A corresponding slot 452 may be in the guard body 404. The slot 452 may be configured to receive the fastening body 448 and/or the fastening mechanism 428. The slot 452 may include an opening within the guard body 404.

In some embodiments, such as the one shown in FIG. 3, the fastening body 448 may include an air outlet 424. The air outlet 424 may be configured to be in fluid communication with a cup portion of the lock assembly 600, for example. The cup portion may be where the lock assembly 600 comes in contact with the key (for example, electronic key 650). Accordingly, the air outlet 424 can provide an air passageway between the otherwise enclosed space within the fluid guard and the environment. This air access can promote the evaporation or otherwise removal of any accumulated fluid in or around the fluid guard 400. The air outlet 424 may define an air flow passage through which air may enter and/or exit. The air flow passage may have an axis that is parallel to the hinge axis and/or perpendicular to the major axis of the lock assembly 600.

The guard head 408 may include one or more sidewalls 456. The sidewalls 456 can create a fluid seal along one or more sides of the fluid guard 400. The one or more sidewalls 456 can guide or wick fluid away from the aperture 416 along a length of the sidewalls 456. This wicking or guiding action may help avoid or reduce the likelihood of fluid entering between the guard body 404 and the guard head 408. The sidewalls 456 may be disposed approximately parallel to the major axis of the fluid guard 400. In some embodiments, the sidewalls 456 may be curved (for example, to align with the guard body 404). Other orientations and shapes are possible. For example, the sidewalls 456 may be disposed on the guard body 404 in some embodiments.

The example guard body 404 shown includes an aperture 416. The aperture 416 may allow insertion of a key (for example, the electronic key 650) therethrough. The aperture 416 can be aligned approximately centrally within the guard body 404 (for example, at an intersection of the major and minor axes of the guard body 404). In some embodiments, the aperture 416 is approximately circular, though other shapes (for example, rectangular, elliptical, etc.) are possible. The aperture 416 may be surrounded at least in part or in full by a rim 444, as shown. The rim 444 may be a raised portion relative to a surface of the guard body 404, thereby further protecting the lock face 612 (see FIG. 1B) from fluid entry.

The rim 444 may be configured to receive a connector frame 432 disposed on the guard head 408. The connector frame 432 can be a raised portion relative to a surface of the guard head 408. For example, the connector frame 432 may include a raised rim that fits within the rim 444 and/or the aperture 416. The raised rim of the frame 432 may have a circular perimeter or circular cross section, although other shapes are possible (such as oval, square, and rectangular). The raised rim may have an internal perimeter that is circular or some other shape. The internal perimeter may be a portion of the frame 432 that contacts the fluid absorber 500 and that at least partially holds the fluid absorber 500 in place. The connector frame 432 may have a friction fit with the rim 444 to further protect the lock face 612 (see FIG. 1B) from fluid entry.

The connector frame 432 can house the fluid absorber 500. The fluid absorber 500 can advantageously wipe, absorb, or otherwise wick away fluids from the lock face 612 (see FIG. 1B), to prevent or reduce the likelihood of fluids from interfering with capacitive communications between the lock and a key (see FIG. 2). The fluid absorber 500 is described in greater detail below with respect to FIG. 5. Near a distal end of the guard head 408, an extension 460 may be provided to aid a user in opening the guard head 408.

Figure 4:
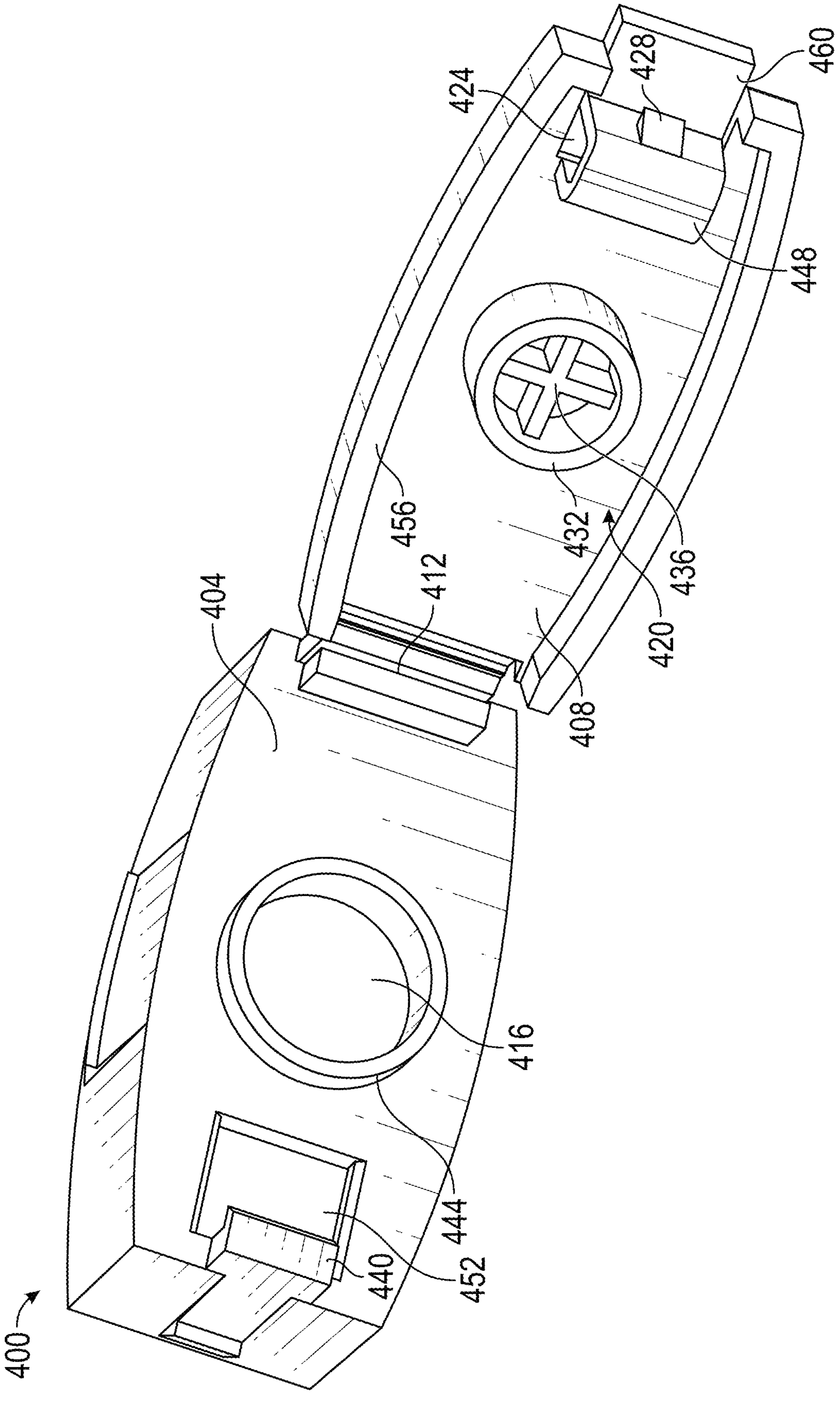
FIG. 4 shows the fluid guard of FIG. 3 without a fluid absorber.

FIG. 4 shows the example open fluid guard 400 of FIG. 3 without the fluid absorber 500. A support 436 is shown. The support 436 may be a raised portion from a surface of the guard head 408. The support 436 may be configured to support a fluid absorber 500 (not shown in FIG. 4). The support 436 may include an adhesive or other material or mechanical construction configured to encourage the fluid absorber 500 to remain within the connector frame 432 once the fluid absorber 500 has been inserted or connected.

Example Fluid Absorber

Figure 5:
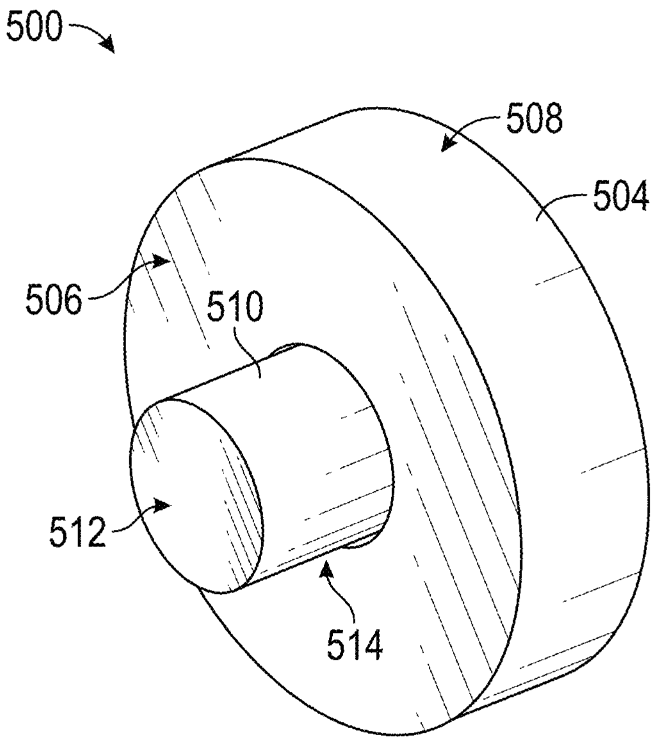
FIG. 5 shows a perspective view of a front of an example fluid absorber.

FIG. 5 illustrates the example fluid absorber 500 described above in more detail. The example fluid absorber 500 shown includes a protruding portion 510 and an annular portion 504. The fluid absorber 500 can, but need not, exhibit axial symmetry about an absorber axis. The absorber axis may be parallel to the direction of insertion of a key (for example, the electronic key 650). The annular portion 504 may be configured to surround a portion of the protruding portion 510. The protruding portion 510 may include a proximal surface 512 and a peripheral surface 514. The annular portion 504 may surround a portion of the protruding portion 510 along a peripheral surface 514. The annular portion 504 may similarly include a proximal surface 506 and a peripheral surface 508. The proximal surface 506 of the annular portion 504 may be approximately parallel to the proximal surface 512 of the protruding portion 510. One or more of the peripheral surface 514 and/or the peripheral surface 508 may be disposed parallel to the absorber axis.

The proximal surface 512 of the protruding portion 510 may be spaced less than an inch from the proximal surface 506 of the annular portion 504. In some embodiments, the distance between the proximal surfaces 506, 512 may be about ¼ inch. The annular portion 504 may have a height of between about 1/32 inch and ½ inch. In some embodiments, the height of the annular portion 504 is about ⅛ inch. The protruding portion 510 may have a height of between about 1/16 inch and ¾ inch. In some embodiments, the height of the protruding portion 510 is about ¼ inch.

The annular portion 504 and the protruding portion 510 may be two separate elements, as shown. However, in some embodiments, the annular portion 504 and the protruding portion 510 together form a single element. In embodiments, where they are separate elements, the protruding portion 510 may be inserted into the annular portion 504 using one or more types of interfaces. For example, the interface may be a friction fit and/or an adhesive attachment.

When the guard head 408 is brought into contact with or in proximity to the guard body 404, the protruding portion 510 of the fluid absorber 500 can mate with (for example, be inserted into, snap fit with, friction fit with, or the like) a receptacle (for example, an interior cup) of a portion of the lock core, such as a recessed portion of the lock face 612, while the annular portion 504 can contact and/or protect an exterior annulus of a portion of the lock core (for example, a different portion of the lock face 612). For example, with respect to FIG. 11 (discussed in greater detail below) the protruding portion 510 may be inserted into a cup 1452 of the lock face 612 while the annular portion 504 can contact the annulus surrounding the cup 1452 (and optionally cover all or substantially all of the lock face surrounding the cup 1452). When the fluid absorber 500 is inserted into the cup 1452 and/or contacts the lock face 612, fluid can be absorbed and/or wicked away. Further, the proximal surface 512 of the protruding portion 510 may interface with a bottom of the cup portion of the lock assembly 600 (for example, the cup 1452 in FIG. 11). The guard head 408 may bring the fluid absorber 500 into contact with or at least in proximity to a portion of the lock, such as the lock face 612. For example, the guard head 408 can bring the fluid absorber 500 within a short distance of the lock face 612, such as within less than 0.1 mm, 0.2 mm, 0.5 mm, 0.75 mm, 1 mm, or 2 mm (or any value therebetween) of the lock face 612. Even in situations where the fluid absorber 500 is in proximity to the lock face 612 and not in strict contact, the fluid absorber 500 can still be effective at wiping, wicking away and/or absorbing fluid disposed on the lock face 612.

Because the example fluid absorber 500 is shaped to enter the interior cup of the lock face and/or contact or come into proximity to the exterior of the lock face, the fluid absorber 500 can contact and/or protect a significant portion of the surface area of the lock face. As a result, the fluid absorber

500 can be very effective at wiping, wicking away, or absorbing water from many or all surfaces of the lock face, including the operative surfaces and the surface adjacent to and surrounding the operative surfaces.

In other embodiments, the fluid absorber may be shaped differently. The shape of the fluid absorber may conform more fully to the lock face, including by having any ridges, valleys, or protrusions desired to conform to the shape of the lock face. Other example fluid absorbers may not have the protrusion 510 but instead may be a flat or substantially flat disk. For example, with some electronic locks that use electrical contacts instead of capacitive or inductive coupling, a flatter or more planar surface fluid absorber may be used.

The fluid absorber 500 can include an antibacterial element. For example, the fluid absorber 500 can include an antimicrobial agent that is configured to destroy microbes that may be present in the fluid or on the surface of the lock. This may further prolong the life of the lock assembly 600 and/or the electronic key 650. For example, the fluid absorber 500 can include a compound including silver or another antimicrobial element or compound.

The material of the fluid absorber 500 can be a foam or foam-like material for fluid absorption purposes. For example, the material may comprise polyvinyl alcohol (PVA) and/or polyurethane (PUR). The material may include small (for example, on the order of microns) pockets of air configured to promote absorption of liquid. For example, the material may be a closed-celled foam or open-celled foam, but a closed-cell foam is preferable in some embodiments because it may draw water away from the lock face 612 without retaining water like an open-celled foam. The material may be configured to absorb between about 5 and 15 times its weight in fluid. In some embodiments, the material can absorb between about 9 and 13 times its weight in fluid. For example, the material may be configured to absorb about 12 times its weight in fluid. In some embodiments, the material is configured to absorb at least 3 times its weight in fluid.

Figure 6:
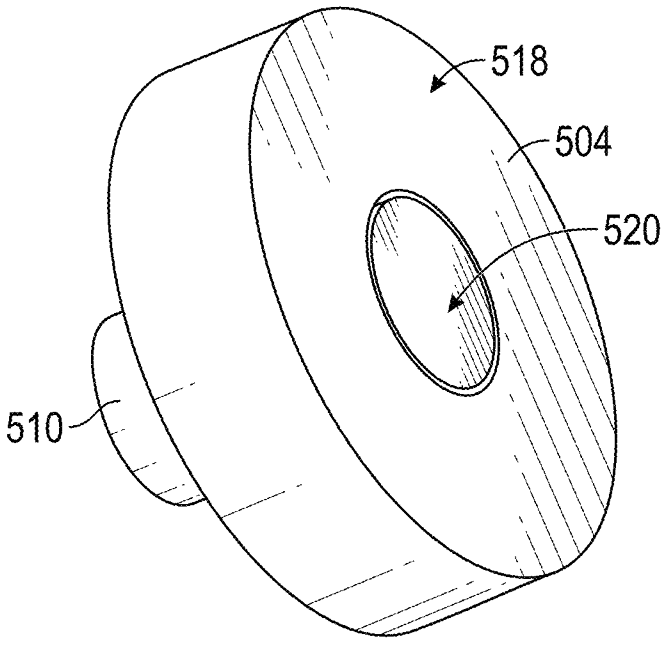
FIG. 6 shows a perspective view of a back of the example fluid absorber of FIG. 5.

FIG. 6 illustrates a back view of the example fluid absorber 500 shown in FIG. 5. A distal surface 518 of the annular portion 504 may be approximately coplanar with a distal surface 520 of the protruding portion 510. As mentioned herein, the protruding portion 510 and the annular portion 504 may be formed as a single element. For example, they may be machined or molded as a single element. The protruding portion 510 and the annular portion 504 may be adhered or otherwise affixed to the support 436. More generally, the fluid absorber, in any of its forms described herein, may be formed from a single piece of material or multiple (for example, two or more) pieces of material.

Figure 7:
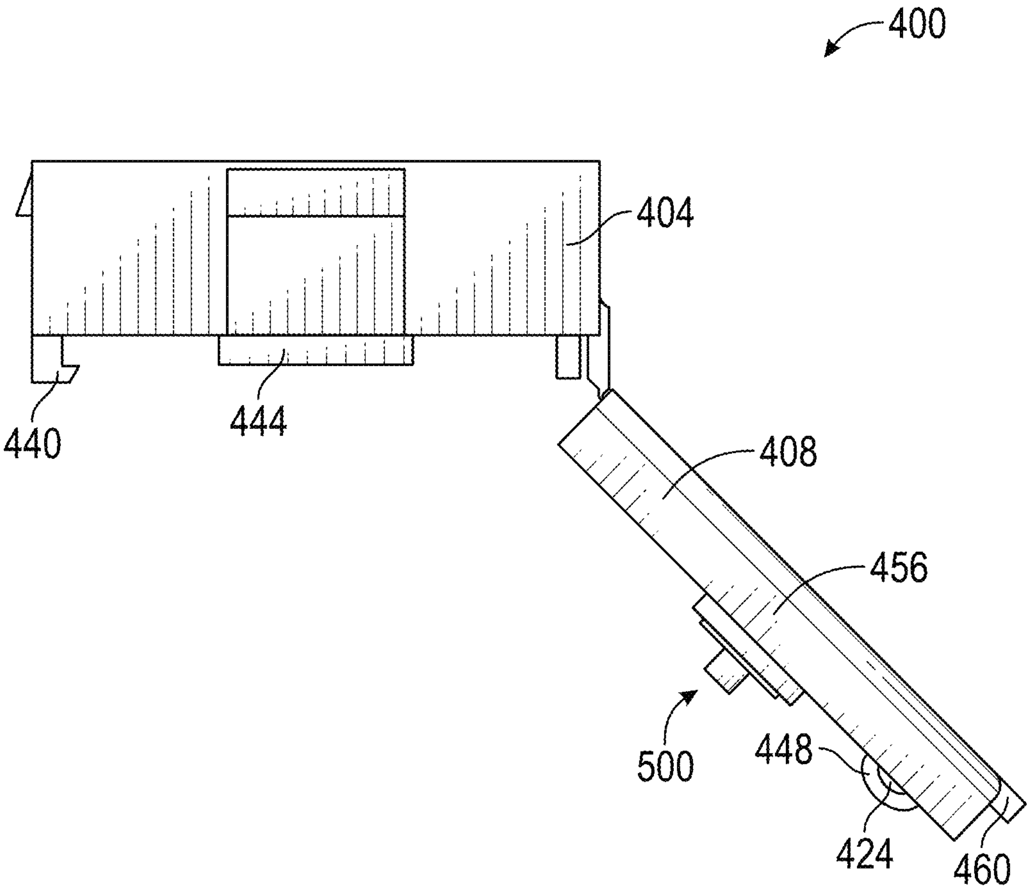
FIG. 7 shows a side view of an example fluid guard with an example fluid absorber.
Figure 8:
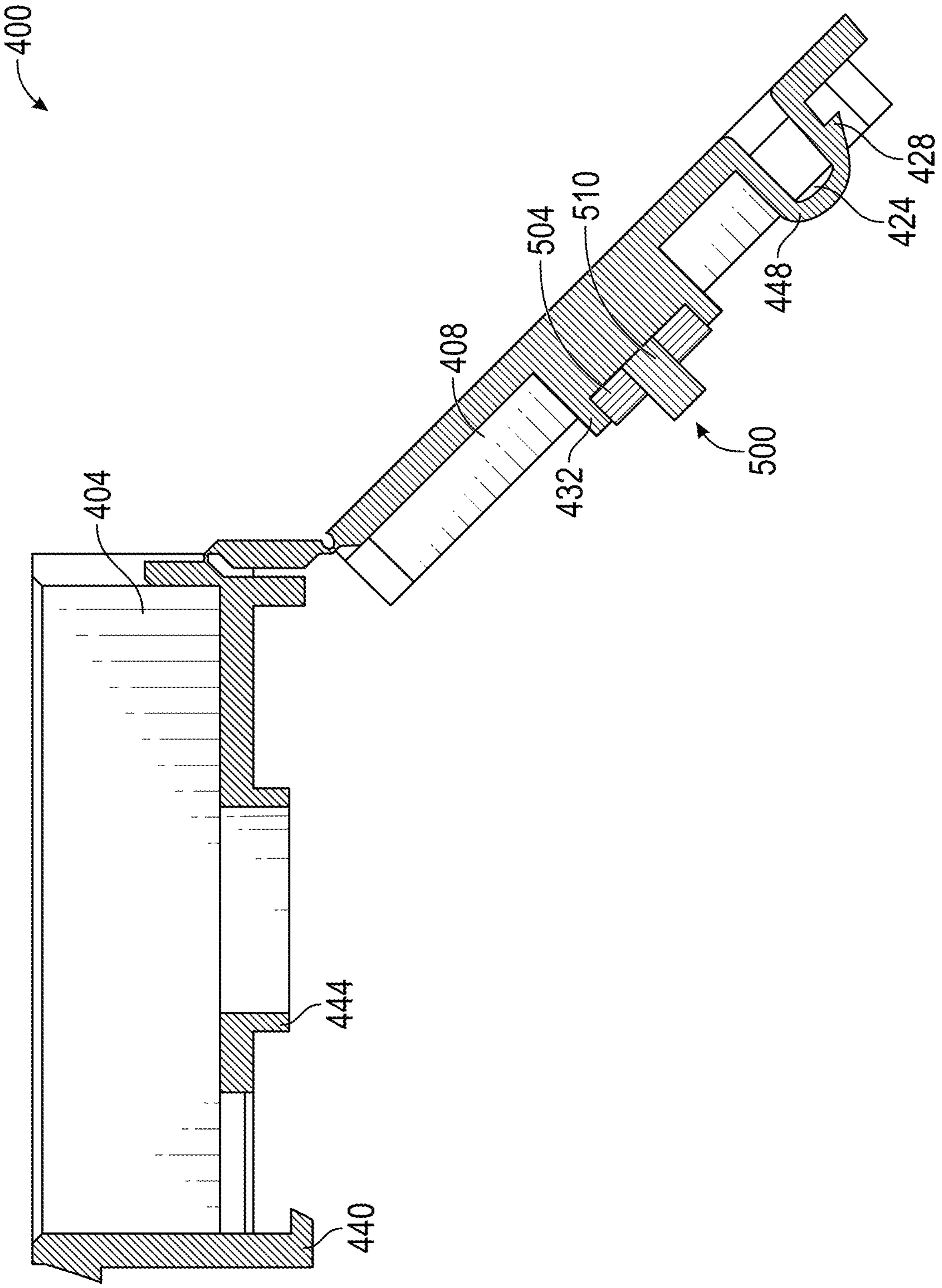
FIG. 8 shows a cross-sectional side view of the example fluid guard of FIG. 7.
Figure 9:
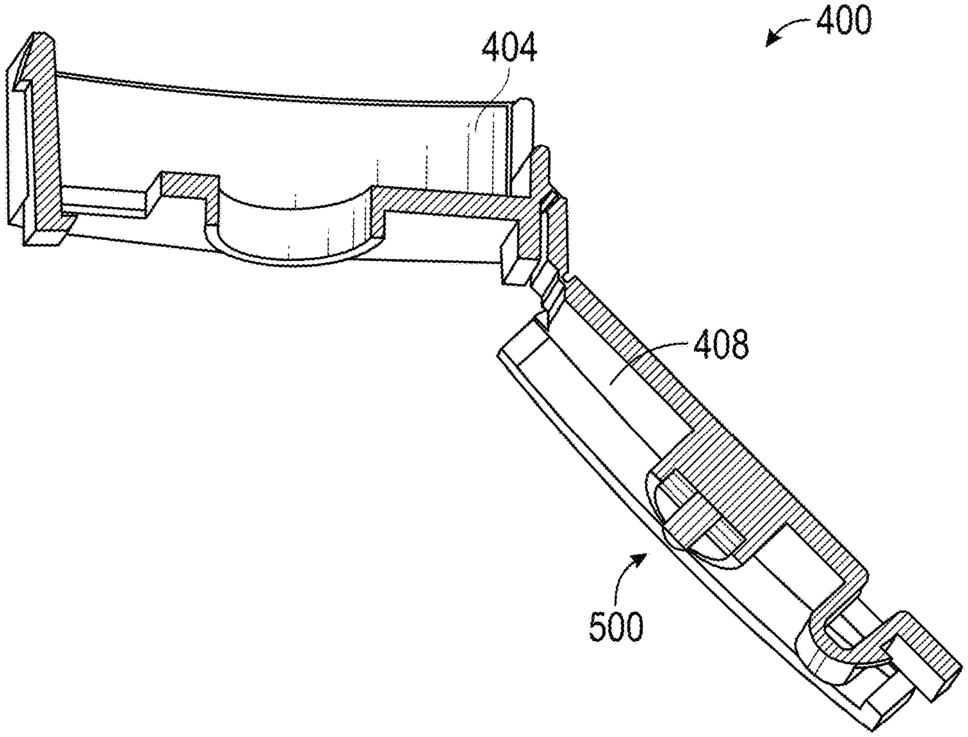
FIG. 9 shows a perspective view of the cross-section of FIG. 8.

FIG. 7 a side view of the example fluid guard 400 shown in FIGS. 3-4 including the fluid absorber 500 shown in FIGS. 5-6. FIG. 8 shows a side cross-section view of the fluid guard in FIG. 7 with a central cross section along the major axis of the guard body 404 and the guard head 408. FIG. 9 shows a perspective view of the cross-section of FIG. 8.

Figure 10:
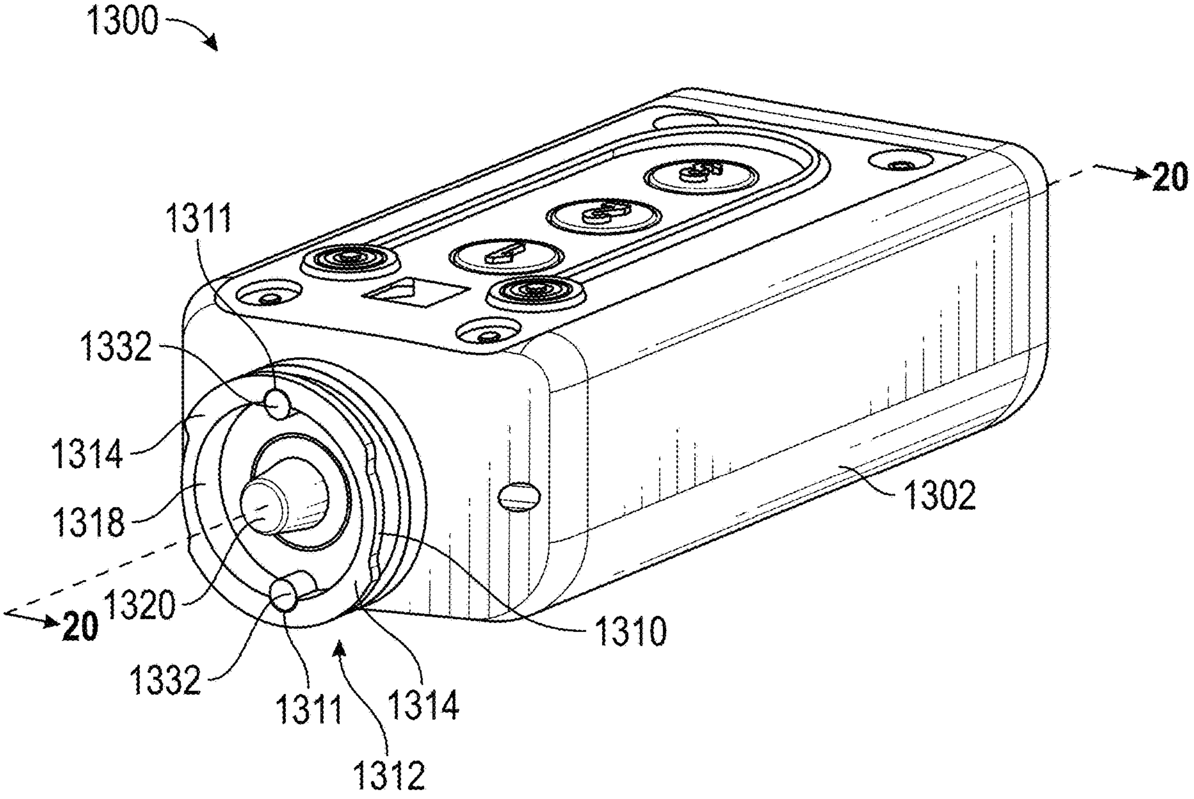
FIG. 10 illustrates a perspective view of an example embodiment of a key having shear pins.

FIG. 10 illustrates an embodiment of a key 1300 having shear pins 1332. The key may include some or all of the features of the electronic key 650 described above with reference to FIG. 2. The key 1300 can be used, for example, to mate with the electronic lock face 612 described above.

The illustrated key 1300 includes an elongate main body portion 1302. In some configurations, the main body portion 1302 is generally rectangular in cross-sectional shape. The illustrated key 1300 also includes a mating portion 1312 of smaller external dimensions than the body portion 1302. The body portion 1302 can house the internal electronics of the key 1300 as well as other components. The mating portion 1312 can engage a lock described below with respect to FIG. 11. The mating portion 1312 includes a cylindrical portion 1310 that houses a power coil 1320 and a capacitive data portion or data coil (not shown). On the outer surface of the cylindrical portion are two tabs 1314. The tabs 1314 can facilitate rotationally engagement between the key 1300 and the lock (see FIG. 11). The tabs 1314 extend radially outward from the outer surface of the cylindrical portion 1310. The illustrated tabs 1314 oppose each another.

Figure 11:
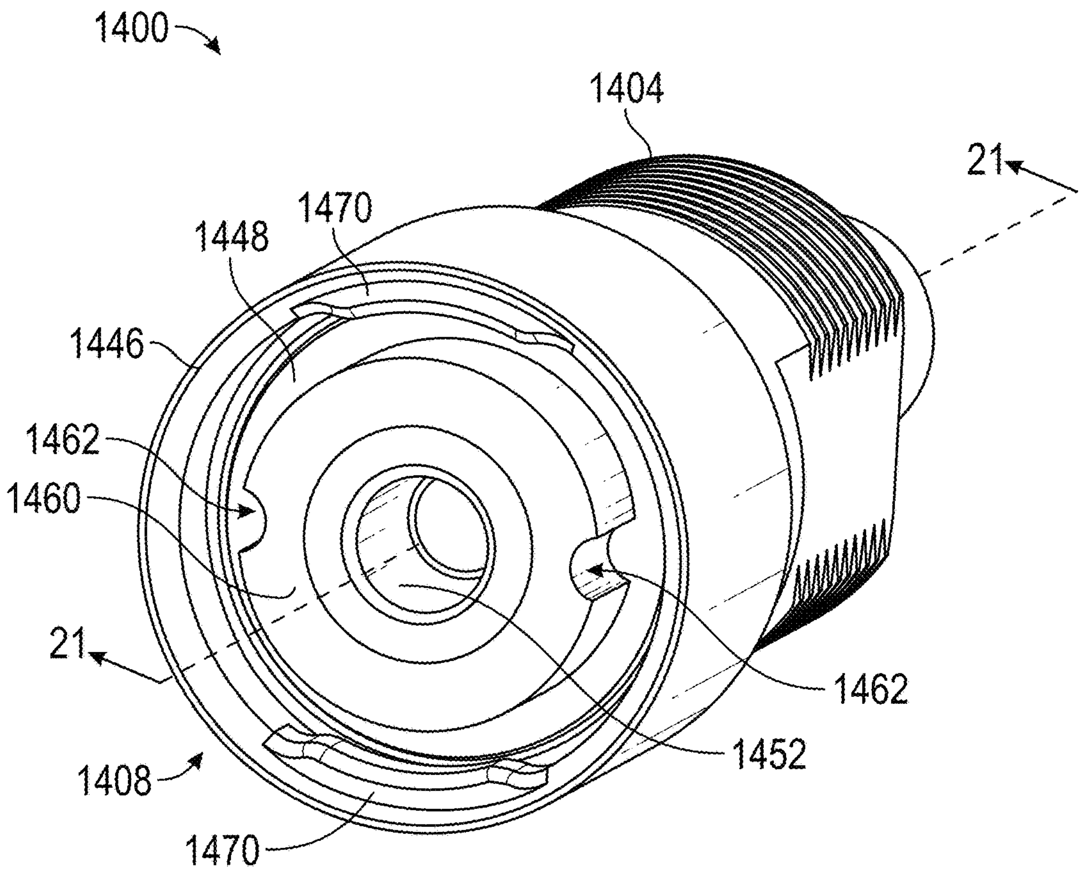
FIG. 11 depicts an embodiment of an example lock core.

FIG. 11 depicts an embodiment of an electronic lock core 1400. The electronic lock core 1400 may include some or all of the features of a lock core described above with reference to the lock assembly 600 of FIGS. 1A-2. A face of the electronic lock core 1400 may correspond to the lock face 612 in FIG. 1B.

The electronic lock core 1400 includes a body portion 1404 and a mating portion 1408. The body portion 1404 may at least partly house one of the coil assemblies described above. The diameter of the mating portion 1408 is larger than the diameter of the body portion 1404. The mating portion 1408 includes a cylinder 1446 and a raised cylindrical portion 1460 disposed within the cylinder 1446. An annular groove 1448 or key recess is formed between the cylinder 1446 and the raised cylindrical portion 1460. The annular groove 1448 is capable of receiving the tabs 1314 of the key 1300. A cup 1452 is disposed within the raised cylindrical portion 1460. The cup is capable of receiving the power coil 1320 of the key 1300 as well as the protruding portion of the fluid absorber described above. The electronic lock core 1400 may further include one or more notches 1462. The one or more notches 1462 may be configured to mate with the shear pins 1332 of the key 1300.

In certain implementations, the key 1300 may mate with the electronic lock core 1400 by placement of the tabs 1314 in the annular groove 1442, by placement of the power coil 1320 in the cup 1452. The key 1300 may provide data to the electronic lock core 1400, optionally after a user presses a certain button sequence on the key 1300, allowing a locking mechanism of the electronic lock core 1400 to be actuated. The key 1300 may then be turned by an operator of the key to unlock the lock. Locking may proceed, for example, by turning the key 1300 in a reverse motion.

Figure 12:
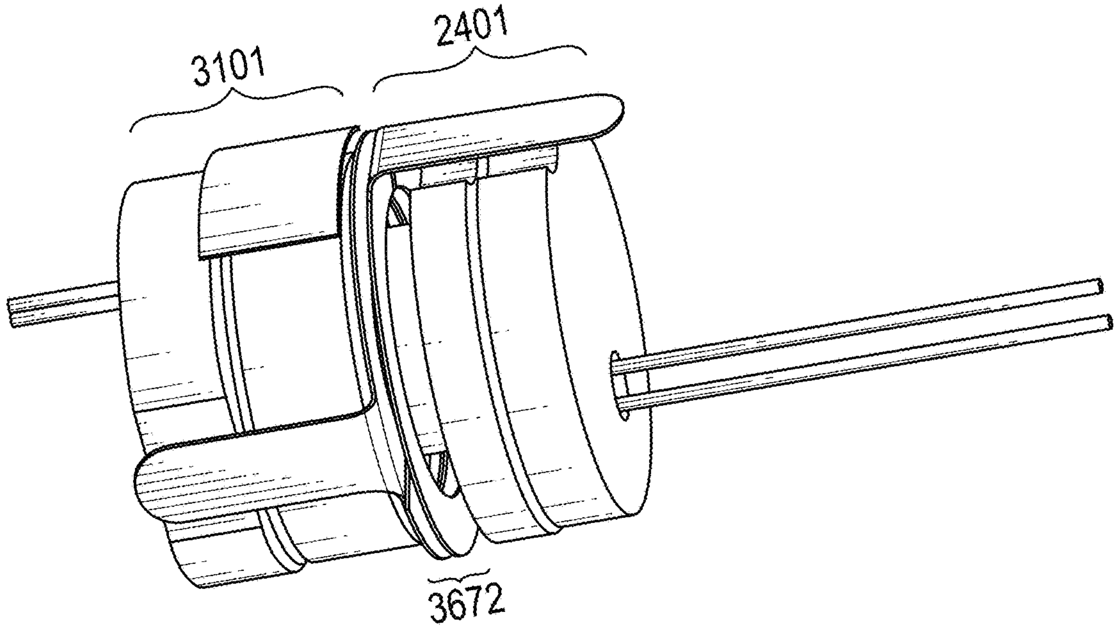
FIG. 12 illustrates a perspective view of internal components of an example embodiment of a key/lock engagement assembly.

FIG. 12 illustrates example internal components of the key and lock described with respect to FIGS. 10 and 11. This figure illustrates how partial capacitors of a cup assembly 3101 and nose assembly 2401 of the lock and key, respectively, may be engaged in order to produce a two-plate capacitor 3672. The outer housings of the respective components are omitted for illustrative purposes only. Although not shown, the partial capacitors of the key and lock assemblies may be covered by a dielectric layer, such as a plastic, for example. The plastic or other material may provide a dielectric effect between the capacitor plates, thereby potentially increasing the capacitance of the capacitor 3672.

As described above, fluid that accumulates between the partial capacitors can change the capacitance undesirably. Thus, the fluid absorber 500 may be inserted into the cup assembly 3101. In this way, the fluid absorber 500 can wipe away, wick away, and/or absorb fluid to reduce or eliminate changes to the capacitance of the capacitor 3672.

Example Electronic Lock Fluid Guards

Figure 13:
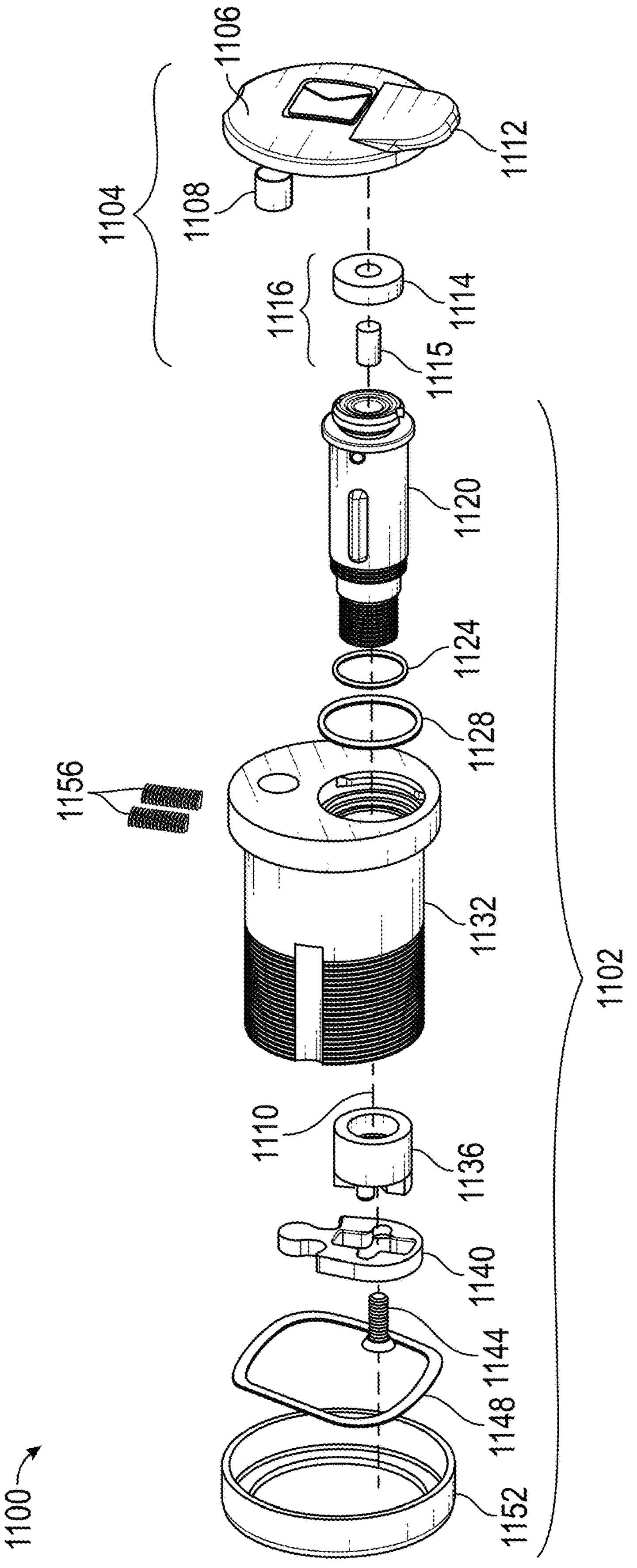
FIG. 13 is an exploded view of an example locking system that includes a lock assembly and a locking device fluid guard.

FIG. 13 is an exploded view of another example locking system 1100 that includes a lock assembly 1102 and a locking device fluid guard 1104. The locking device fluid guard 1104 may include a guard body 1106 and a fluid absorber 1116. The locking system 1100 includes a lock core 1120 that is mounted within a lock shell 1132. A first sealing element 1124 and a second sealing element 1128 are disposed between corresponding surfaces of the lock core 1120 and the lock shell 1132 to prevent or at least reduce the likelihood of the flow or leakage of fluid between an interior of the lock shell 1132 and elements of the lock core 1120. One or both of the first sealing element 1124 and/or the second sealing element 1128 may comprise an O-ring. One or both of the first sealing element 1124 and/or the second sealing element 1128 may comprise a resilient material advantageously to promote a sufficient seal between the interior of the lock shell 1132 and the lock core 1120. The lock core 1120 may be inserted into the interior of the lock shell 1132 along an assembly axis 1110.

One or both of the lock core 1120 and the lock shell 1132 may be generally cylindrical in shape. The lock core 1120 may be inserted into the lock shell 1132 via a face (not labeled in FIG. 13) of the lock shell 1132. The face of the lock core may include a capacitive interface. A face of the lock core 1120 may be at a proximal end of the lock core 1120 and may be configured to interface with a distal end of the fluid absorber 1116, as described below herein in more detail. As used herein with respect to the locking system 1100, distal and proximal may be in reference to a user of the locking system 1100, such as one who is accessing the lock assembly 1102 places the distal end of the key adjacent to or in contact with the proximal end of the lock assembly 1102.

The lock assembly 1102 may further include a cam adapter 1136 and a lock cam 1140. The lock cam 1140 may be coupled (e.g., fastened) onto the lock core 1120 with one or more coupling elements 1144. The one or more coupling elements 1144 may include, for example, a screw. The lock cam 1140 can be keyed to a distal end of the cam adapter 1136 so that when the lock core 1120 is rotated, the cam adapter 1136 and the lock cam 1140 also rotate. Rotation of the lock cam 1140 (e.g., via rotation of the cam adapter 1136) can cause the lock to move between an opened position and a closed position. For example, a downward turn of the lock cam 1140 may unlock the lock by depressing a button within the lock shell 1132. The depression of that button may cause the lock to open.

At the distal end of the lock assembly 1102, a compression element 1152 can couple to the distal end of the lock shell 1132 (e.g., via threads). Between the compression element 1152 and the lock shell 1132, a resilient element 1148 may be placed to promote sufficient tension at the coupling between the compression element 1152 and the lock shell 1132.

The fluid absorber 1116 can include an absorber protrusion 1115 and an absorber base 1114. The fluid absorber 1116 may share one or more features with the fluid absorber 500 described above. Additionally or alternatively, the absorber protrusion 1115 may share one or more features of the protruding portion 510 described above, and/or the absorber base 1114 may share one or more features of the annual portion 504 described above. For example, the fluid absorber 1116 may be axially symmetric (e.g., about the assembly axis 1110). Additionally or alternatively, the absorber protrusion 1115 may be generally cylindrical, and/or the absorber base 1114 may form an annulus. The assembly axis 1110 may be parallel to a direction of insertion of a key (for example, an electronic key such as the electronic key 650 described above). The absorber base 1114 may surround at least a portion of the absorber protrusion 1115. One or more of the peripheral surface 514 and/or the peripheral surface 508 may be disposed parallel to the absorber axis.

The absorber base 1114 and the absorber protrusion 1115 may be two separate elements, as shown. However, in some embodiments, the absorber base 1114 and the absorber protrusion 1115 together form a single element.

Figure 14A:
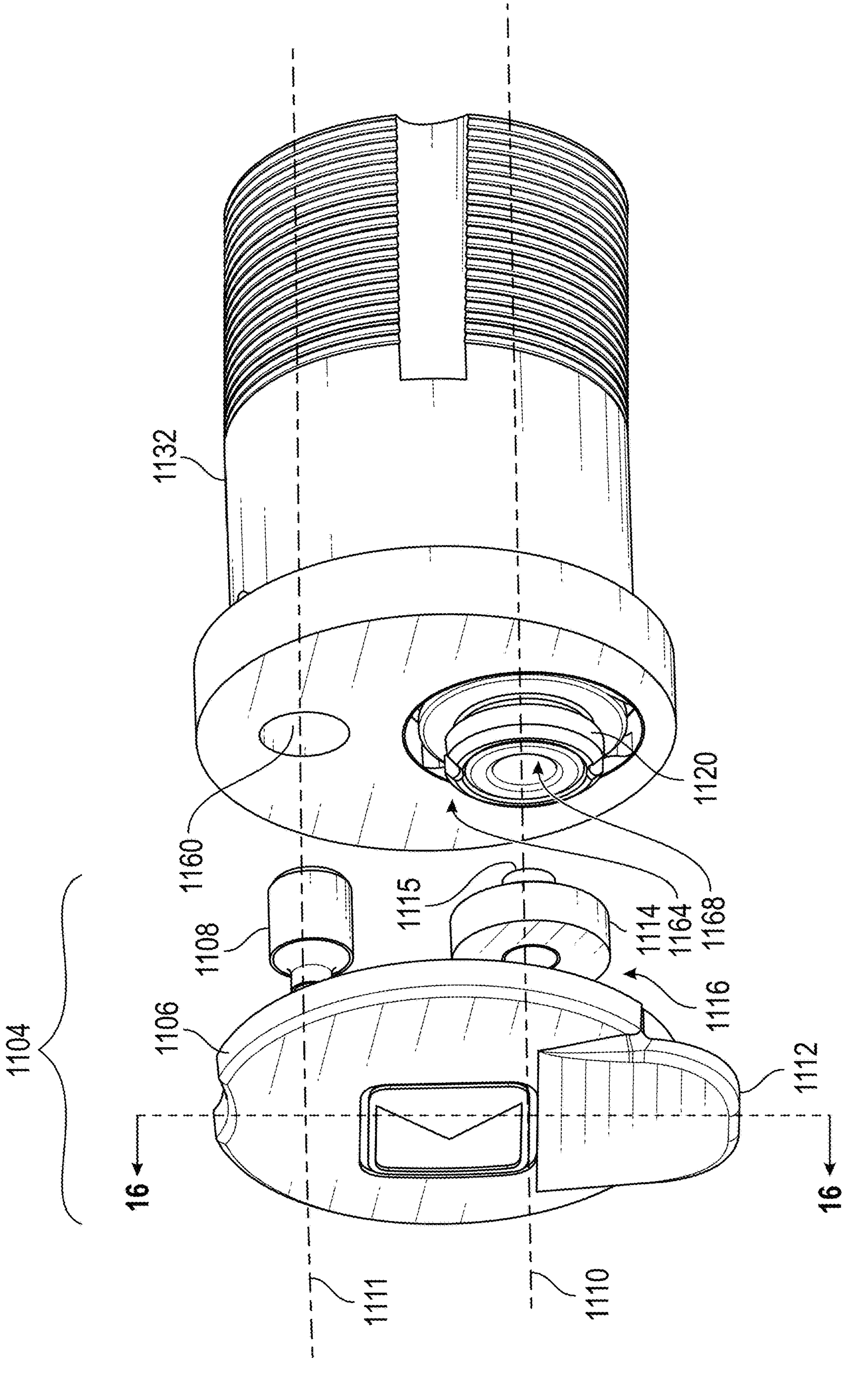
FIG. 14A shows a front isometric partially exploded view of the locking device fluid guard and lock of FIG. 13.

FIG. 14A shows a front isometric exploded view of the locking device fluid guard 1104 and lock. The absorber protrusion 1115 of the fluid absorber 1116 can mate with (e.g., be inserted into, snap fit with, friction fit with, or the like) a receptacle (for example, an interior cup 1168) of a portion of the lock core 1120, such as a face of the lock core 1120. The absorber base 1114 can protect and/or cover at least a portion of an exterior annulus of a portion of the lock core 1120. The absorber base 1114 can mate with the lock cup 1168 of the lock core 1120.

In a closed configuration of the locking device fluid guard 1104, the absorber protrusion 1115 may be inserted into the cup 1168 of the lock face 1164, and/or the absorber base 1114 can contact an annulus surrounding the lock cup 1168 (and, in some embodiments, cover all or substantially all of the lock face 1164 surrounding the lock cup 1168). When the fluid absorber 1116 contacts the lock face 1164, fluid can be absorbed and/or wicked away.

In some embodiments, at least a portion of the locking device fluid guard 1104 (e.g., the guard body 1106) comprises a semi-resilient or resilient material. The material may include a thermoplastic elastomer (TPE), such as polyurethane rubber. The material may be semi-resilient, which may allow the guard body 1106 to snap into place when moving into the closed configuration. For example, the material may have a Shore A durometer of between about 50 and about 95. In some embodiments the durometer is between about 60 and about 90. In some embodiments the durometer is between about 70 and about 80. When in the closed configuration, the guard body 1106 may at least partially cover a face of the electronic lock and/or may cause the fluid absorber 1116 to contact or at least come into proximity to a portion of the lock, such as the lock face 1164. For example, the guard body 1106 can bring the fluid absorber 1116 within a distance of the lock face 1164 of less than about 0.1 mm, less than about 0.2 mm, less than about 0.5 mm, less than about 0.75 mm, less than about 1 mm, or less than about 2 mm (or less than any value therebetween) of the lock face 1164.

Because the example fluid absorber 1116 shown is shaped to enter the interior cup of the lock face and/or contact or come into proximity to the exterior of the lock face, the fluid absorber 1116 can cover and/or protect a significant portion of the surface area of the lock face. As a result, the fluid absorber 1116 can be effective at wiping away, wicking away or absorbing fluid (e.g., water) and or other undesired substances from some or all surfaces of the lock face. This may in turn promote improved communication between the electronic key and the lock assembly 1102.

As noted above, the fluid absorber 1116 can include an antibacterial material. For example, the fluid absorber 1116 can include an antimicrobial agent that is configured to destroy microbes that may be present in the fluid and/or substances in the fluid. This benefit may further prolong the life of the lock assembly 1102 and/or the electronic key 650.

For example, the fluid absorber 1116 can include silver (e.g., silver nitrate) or another antimicrobial element or compound.

The material of the fluid absorber 1116 can include a foam or foam-like material for fluid absorption purposes. For example, the material may comprise polyvinyl alcohol (PVA) and/or polyurethane (PUR). In some embodiments the material includes a polyurethane rubber. The material may include small (for example, on the order of microns) pockets of air configured to promote absorption of liquid. For example, the material may be a closed-celled foam or open-celled foam, but a closed-cell foam is preferable in some embodiments because it may draw water away from the lock face 1164 without retaining water like an open-celled foam. The material may be configured to absorb between about 5 and 15 times its weight in fluid. Other absorption factors described above are possible.

Figure 15:
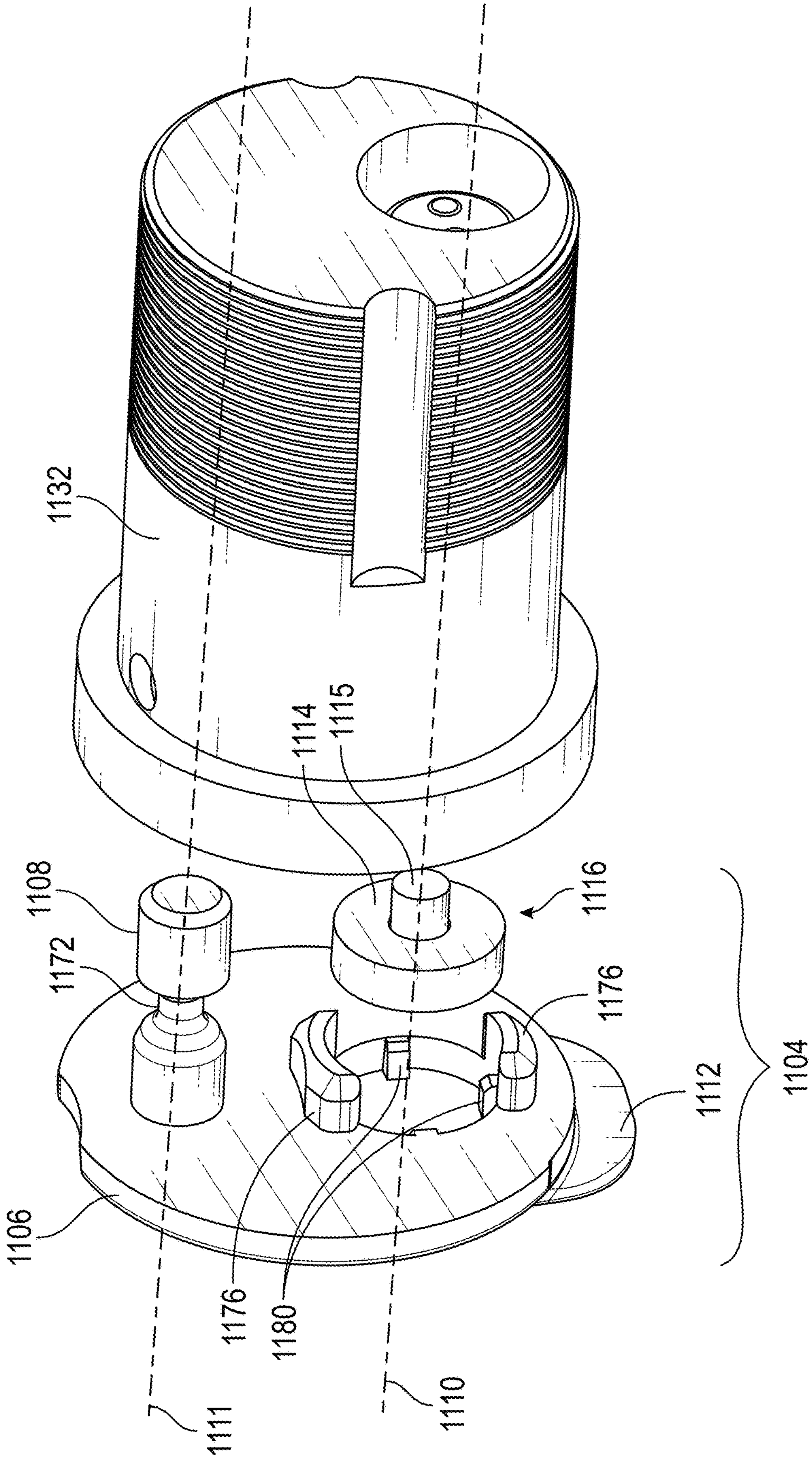
FIG. 15 shows a back isometric partially exploded view of the locking device fluid guard and lock of FIG. 13.

FIG. 15 shows a back isometric exploded view of the locking device fluid guard 1104 and lock. As mentioned above, the absorber protrusion 1115 and the absorber base 1114 may be formed as a single element. For example, they may be machined or molded as a single element. However, as shown in FIG. 15, the absorber base 1114 and the absorber protrusion 1115 are coupled (e.g., adhered) to one another.

Figure 14B:
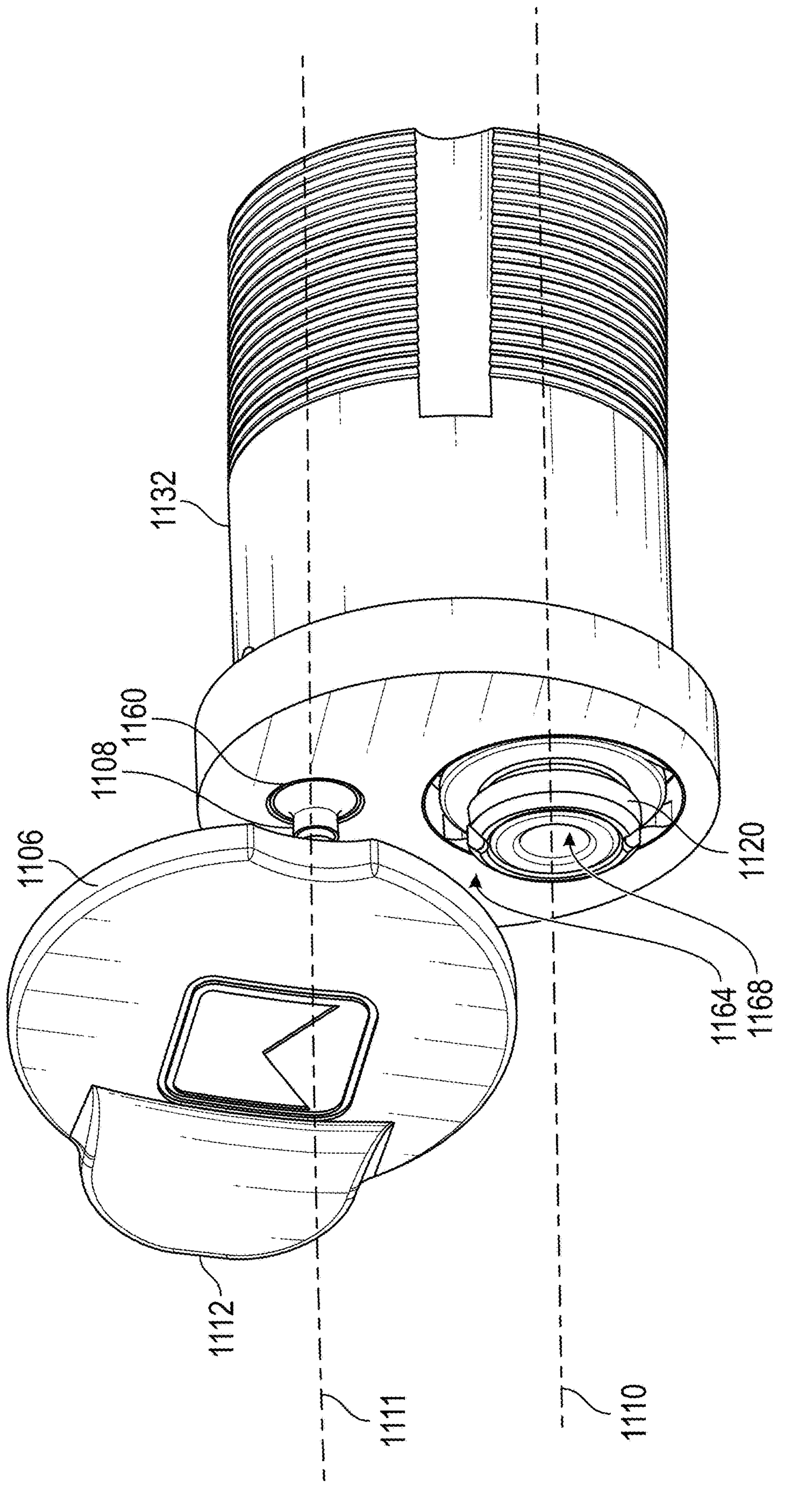
FIG. 14B shows a front isometric view of the locking device fluid guard and lock of FIG. 13 with a guard body of the locking device fluid guard at least partially translated and rotated about an axis.

The absorber protrusion 1115 and the absorber base 1114 may be adhered or otherwise coupled to the guard body 1106, such as within a guard recess 1184 formed within a backside of the guard body 1106. The guard body 1106 may be generally flat and may comprise a disc or be disc-like. The guard recess 1184 may be shaped to receive the fluid absorber 1116. The guard recess 1184 can be an opening or a pocket. One or more guard ears 1176 may at least partially surround the guard recess 1184 and/or may extend axially from the backside of the guard body 1106. The one or more guard ears 1176 may be shaped to receive and/or support the fluid absorber 1116. For example, as shown, the one or more guard ears 1176 can have a curvature that is substantially the same as a curvature of the guard recess 1184. The one or more guard ears 1176 may be configured to at least partially surround and/or protect a face of the lock core 1120 (not shown in FIG. 15). The one or more guard ears 1176 may be configured to fit at least partially within the lock shell 1132. The one or more guard ears 1176 may allow the guard body 1106 to rotate around the coupling axis 1111 (e.g., when moving into or out of the open configuration). FIG. 14B illustrates the guard body 1106 at least partially rotated around the coupling axis 1111. Thus, for example, the one or more guard ears 1176 may not fully surround the guard recess 1184. In some embodiments the one or more guard ears 1176 comprises two guard ears 1176 disposed opposite each other, as shown in FIG. 15. While the illustrated guard ears 1176 are disposed on the top and the bottom, other configurations are possible. For example, the guard ears 1176 can be configured on the sides. In the illustrated configuration, the upper guard ear 1176 has a recess formed along the radially outer surface so that the upper guard ear 1176 can more easily slip into position. The one or more guard ears 1176 can extend rearward from a back surface of the guard body 1106.

Additionally or alternatively, the locking device fluid guard 1104 may include one or more projections 1180 that extend into the guard recess 1184 of the guard body 1106. The projections 1180 may be configured to support and/or retain the fluid absorber 1116. For example, the projections 1180 may create a friction interface with the fluid absorber 1116 (e.g., the absorber base 1114). The friction interface can promote coupling of the locking device fluid guard 1104 to the fluid absorber 1116.

In some embodiments, the locking device fluid guard 1104 includes a guard flange 1112 that is configured to facilitate manual manipulation of the guard body 1106. The guard flange 1112 may extend from the guard body 1106. In some embodiments, the guard flange 1112 is disposed opposite the coupling protrusion 1108 as shown in FIG. 15. The guard flange 1112 may be attached or molded to a front side of the guard body 1106, such as shown. In use, the guard flange serves as a gripping location for a user to grasp when moving the guard body between a closed position and an opened position.

The coupling protrusion 1108 may be generally cylindrical in shape. Additionally or alternatively, the coupling protrusion 1108 may include a protrusion neck 1172 that is narrower than surrounding portions of the coupling protrusion 1108. The coupling protrusion 1108 is received within a hole 1160 (FIG. 14A). FIG. 14B illustrates the coupling protrusion 1108 at least partially received within the hole 1160. One or more radially extending threaded openings (not shown) can intersect with the hole 1160. The retaining elements 1156 can be inserted into the threaded openings to engage the coupling protrusion. In some configurations, the protrusion neck 1172 may be shaped to couple with the one or more retaining elements 1156 (not shown in FIG. 15) to retain and/or at least partially restrict axial movement of the locking device fluid guard 1104 with respect to the lock.

Figure 16:
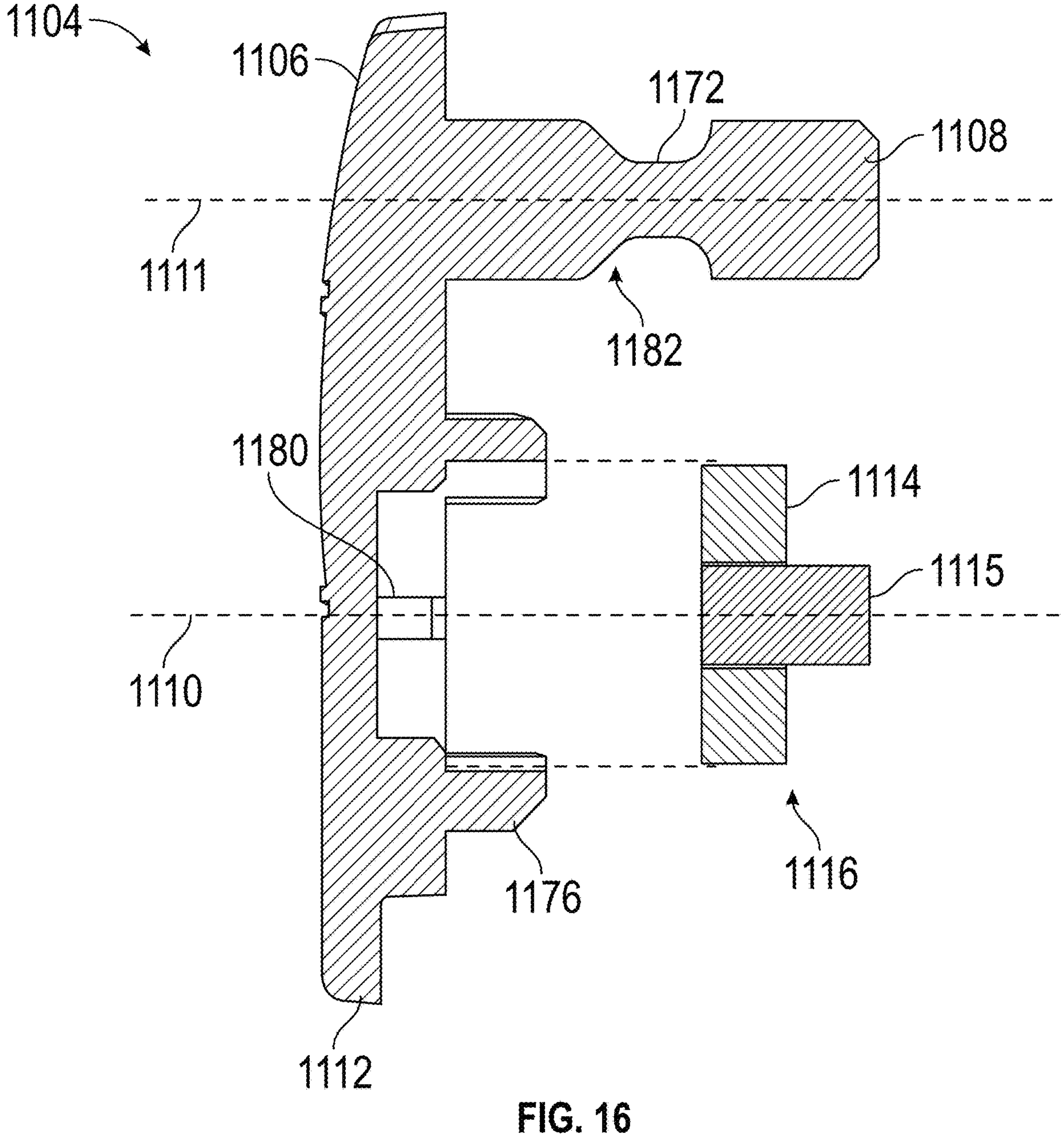
FIG. 16 shows a cross-section taken along the line 16-16 of FIG. 14A.

FIG. 16 shows a cross-sectional side view of the locking device fluid guard 1104. As shown in FIG. 16, the protrusion neck 1172 may not be symmetric along the coupling axis 1111. For example, the protrusion neck 1172 can have a neck profile 1182 that is smoother at the proximal end of the protrusion neck 1172 than at the distal end of the protrusion neck 1172. In some embodiments, such as shown, the neck profile 1182 of the protrusion neck 1172 may include a distal section that is configured to restrict further axial movement of the locking device fluid guard 1104 when the locking device fluid guard 1104 is in the open configuration. The reduced cross-section of the neck profile 1182 can allow some elastic extension of the coupling protrusion. In this way, the neck profile 1182 can allow a user to axially translate the locking device fluid guard 1104 sufficient to decouple the guard ears 1176 from the lock core 1120 and/or for the guard body 1106 to uncover the lock face 1164, but not allow the user to completely decouple the coupling protrusion 1108 from the lock. The elastic nature of the neck profile 1182 also acts to return the locking device fluid guard 1104 to a closed position. In some embodiments, in the open configuration, the guard body 1106 may at least partially uncover the lock face 1164 and the fluid absorber 1116 may at least partially uncover the lock cup 1168 and/or the lock core 1120.

Figure 17:
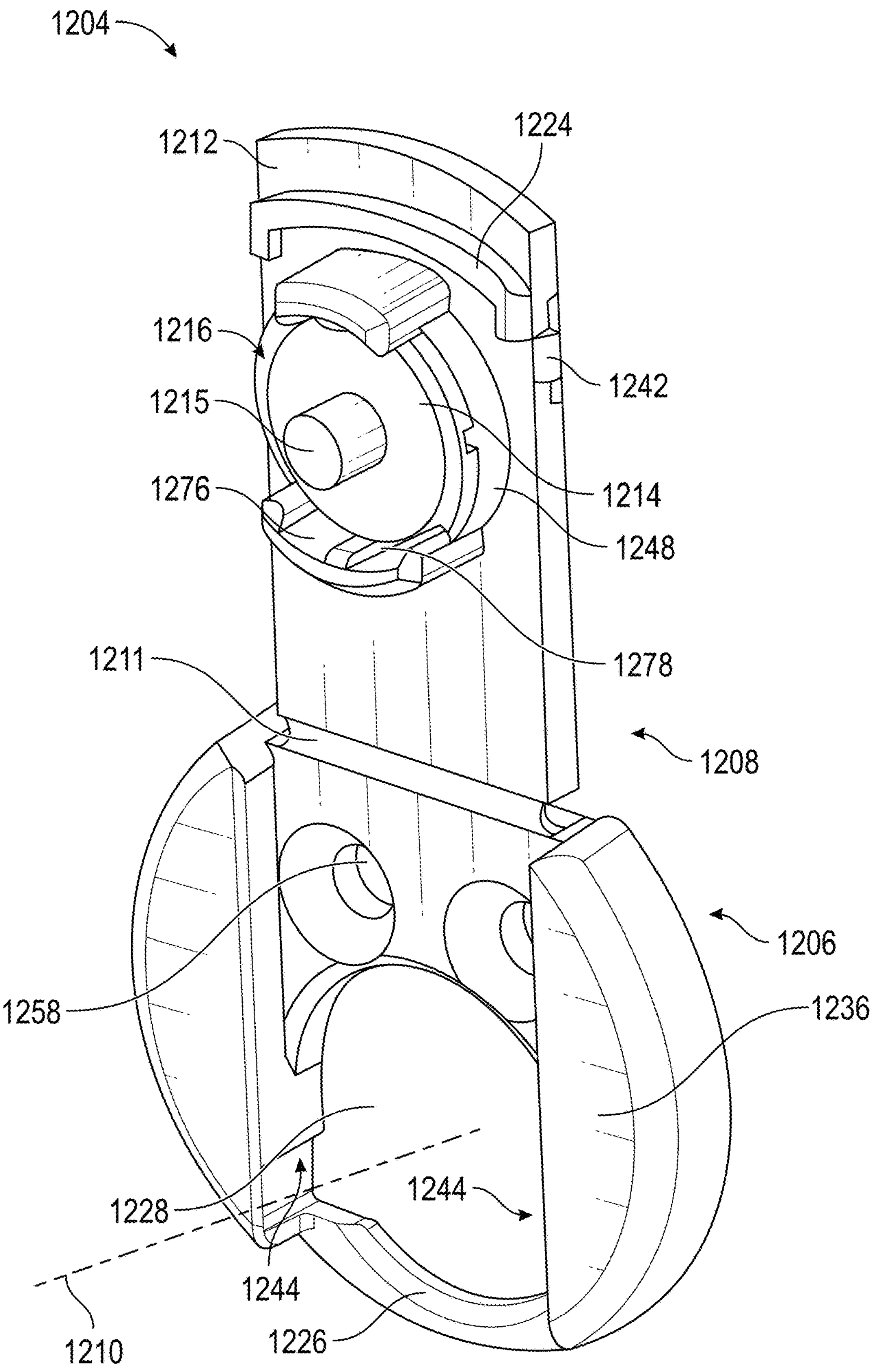
FIG. 17 shows a front perspective view of another example locking device fluid guard that can be installed on a locking device.
Figure 19:
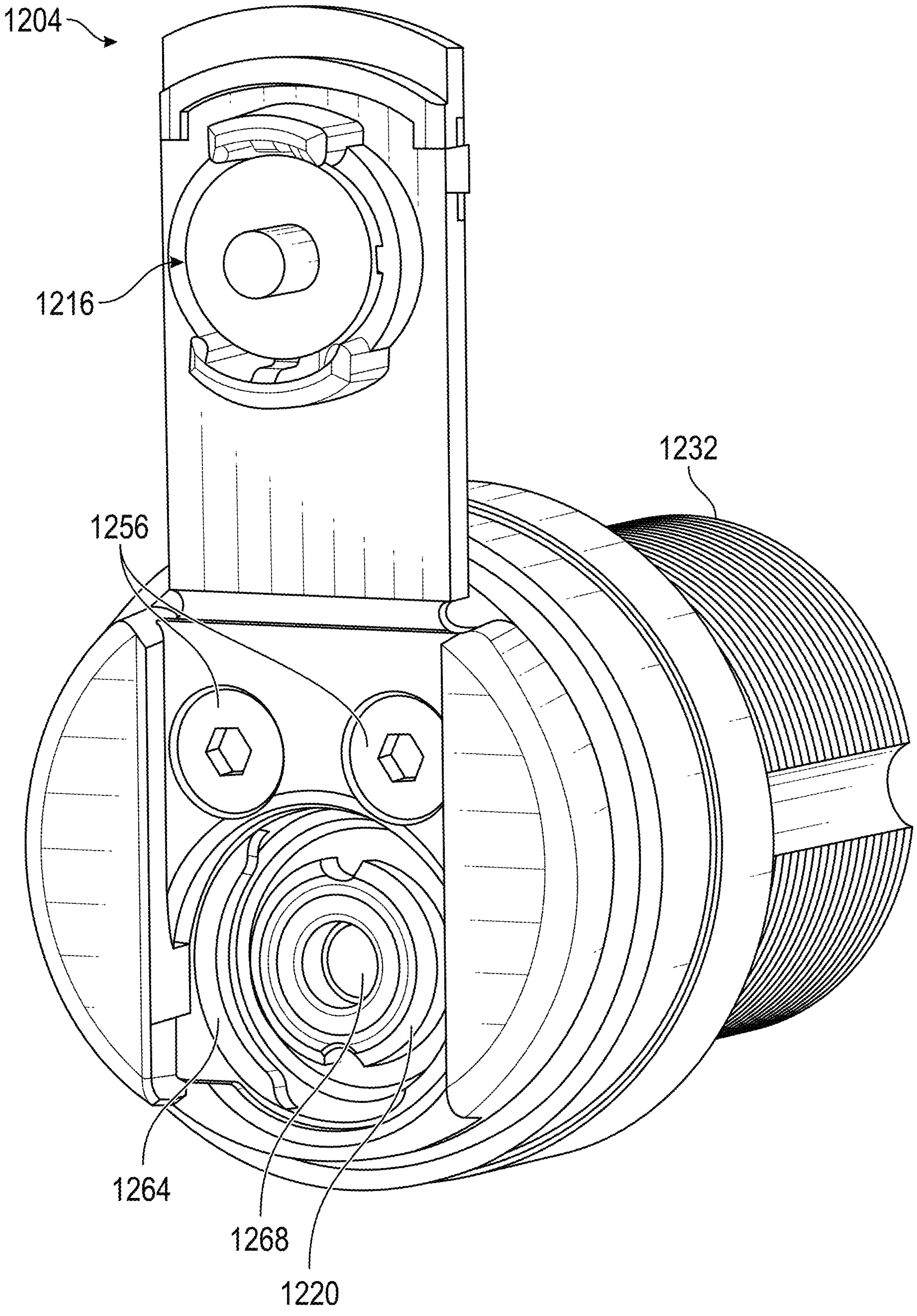
FIG. 19 shows a front perspective view of the example locking device fluid guard of FIG. 17 coupled to a lock shell.

FIG. 17 shows a front perspective view of another example locking device fluid guard 1204 that can be installed on a locking device, such as a mechanical or electronic locking device. The locking device fluid guard 1204 together with the fluid absorber 1216 can block fluids and/or remove or reduce the likelihood of fluid on the lock face 1264 (FIG. 19).

As shown, the locking device fluid guard 1204 is in an open position. The locking device fluid guard 1204 can include a guard body 1206 and a corresponding guard head 1208. As shown, for example, the locking device fluid guard 1204 may be generally circular and/or symmetrical such that a length of the guard body 1206 is about equal to a width of the guard body 1206. The guard body 1206 and guard head 1208 may each be square, oval, round, or otherwise differently shaped than shown here. The guard head 1208 may be shaped and/or otherwise configured to fit at least partially within the guard body 1206 in a closed configuration. For example, sides of the guard head 1208 may be configured to fit within guard walls 1236 of the guard body 1206. In some embodiments, the guard head 1208 is configured to be flush with the guard walls 1236 of the guard body 1206 in a closed configuration.

A hinge 1211 can connect the guard body 1206 and the guard head 1208. In some embodiments, the hinge 1211 defines an axis substantially perpendicular to a direction of insertion of a key (for example, such as the electronic key 650 described above). The hinge 1211 can be a so-called "living hinge" or can have any other suitable configuration. The hinge 1211 can be a single hinge or multiple side-by-side hinges. Desirably, the hinge 1211 guides movement of the guard head 1208 relative to the guard body 1206 when the guard head 1208 is moving among a closed position and an opened position.

To close the locking device fluid guard 1204, one or more coupling elements 1242 on the guard head 1208 can mate with (for example, be inserted into, snap fit with, friction fit with, or the like) corresponding one or more coupling receivers 1244 of the guard body 1206. The coupling elements 1242 can include a cantilevered portion or other ledge (for example, sloped ledge), as shown. In some embodiments, the coupling receivers 1244 may include a slot in a portion of the guard body 1206, such as in one or more guard walls 1236 of the guard body 1206. The one or more coupling elements 1242 may be coupled to (e.g., attached, molded with) corresponding one or more sides of the guard body 1206, as shown. Preferably, the coupling elements 1242 and/or the coupling receives 1244 are configured such that they can join as discussed above but also can be separated from each other to reopen the locking device fluid guard following being closed.

Other mechanisms can be used to close the locking device fluid guard 1204. For instance, the guard head 1208 may be secured in the closed position using a friction fit. Additionally or alternatively, a latch mechanism may be used to second the guard head 1208 in the closed position. In some embodiments, a magnet may be inserted into the fluid absorber 1216 and/or the guard head 1208. A magnetic element (for example, a magnet or a ferrous material) may be inserted in the guard body 1206 to which a magnet may be attracted or vice versa. This configuration can be used to encourage the guard head 1208 to remain in a closed position.

One or more components of the locking device fluid guard 1204 may include a resilient or semi-resilient material, such as those described above with reference to the locking device fluid guard 1104 and/or the lock fluid guard 400 above. The resilient or semi-resilient material may include, for example, a synthetic material such as a synthetic polymer (for example, a synthetic elastomer, a synthetic plastic, etc.). In some embodiments, the durometer may be between about 50 and 90, which may allow the locking device fluid guard 1204 to be slightly firmer than a rubber-like material. Other options are possible. For example, in some embodiments the material is soft enough (e.g., the durometer is low enough) to enable an interference fit or friction fit between the guard head and the guard body so as to further resist fluid entry.

The coupling elements 1242 may be disposed near at the other end of the guard head 1208 from the hinge 1211. Similarly, the coupling receivers 1244 may be located at the other end of the guard body 1206 from the hinge 1211, as shown. Such a configuration enables the coupling elements 1242 and the coupling receivers 1244 to better secure the guard head 1208 in the closed position.

As discussed above, the guard body 1206 may include one or more guard walls 1236. The guard walls 1236 can provide some rigidity to the guard body 1206. The guard walls 1236 also can help create a fluid seal along one or more sides of the lock and/or the face of the lock. Desirably, the guard walls 1236 extend generally vertically so that fluids that attempt to enter between the guards walls 1236 and the guard head 1208 will drip or flow vertically downward. In some embodiments, the guard walls 1236 may be curved (for example, to align with the shape of the lock). Other orientations and shapes are possible. For example, the guard walls 1236 may be disposed on the guard head 1208 in some embodiments, such as described herein.

The example guard body 1206 shown includes a guard aperture 1228. The guard aperture 1228 may allow insertion of a key therethrough (for example, the electronic key 650 described above) or can receive the proximal end of the lock core. In some embodiments, the guard aperture 1228 is approximately circular, though other shapes (for example, rectangular, elliptical, etc.) are possible. The guard aperture 1228 may be defined by and surrounded at least in part or in full by an aperture rim 1226, as shown. In some embodiments, the aperture rim 1226 may be a raised portion relative to a surface of the guard body 1206. Additionally or alternatively, the guard walls 1236 may be raised relative to at least a portion of the aperture rim 1226. An interior portion of the aperture rim 1226 may be chamfered. The chamfered portion may allow for better coupling of the guard head 1208 to the guard body 1206 in the closed position. "Closed position" may be synonymous with "closed configuration." Additionally or alternatively, "open configuration" may be synonymous with "open position." The guard aperture 1228 may define an assembly axis 1210 as shown. The assembly axis 1210 may share one or more features of the assembly axis 1110 described above. For example, the assembly axis 1210 may generally define an orientation of one or more lock components described herein to which the locking device fluid guard 1204 may be coupled. One or more retaining apertures 1258 may be disposed within the guard body 1206 to allow corresponding one or more retaining elements 1256 (see FIG. 19) to pass therethrough. The one or more retaining apertures 1258 may be disposed between the hinge 1211 and the guard aperture 1228. Other locations of the one or more guard aperture 1228 are possible.

The guard aperture 1228 may be configured to receive an absorber retainer 1248 therethrough. The absorber retainer 1248 may be disposed on the guard head 1208 and/or may be configured to couple with the guard body 1206 in a closed configuration. The absorber retainer 1248 can be a raised portion relative to a surface of the guard head 1208. For example, the absorber retainer 1248 may include a raised rim that fits within the aperture rim 1226 and/or the guard aperture 1228. The raised rim of the absorber retainer 1248 may have a circular perimeter and/or circular cross section, although other shapes are possible (such as oval, square, and rectangular). The raised rim may have an internal perimeter that is circular or some other shape. The internal perimeter may be a portion of the absorber retainer 1248 that couples with the fluid absorber 1216 to at least partially hold the fluid absorber 1216 in place. The absorber retainer 1248 may have a friction fit with the aperture rim 1226 to further protect the lock face 1264 from fluid entry in a closed configuration. In some configurations, adhesives or the like also can be used to help secure the fluid absorber 1216 relative to the absorber retainer 1248.

The absorber retainer 1248 can house the fluid absorber 1216. The fluid absorber 1216 can advantageously wipe, absorb or otherwise wick away fluids from the lock face 1264. The fluid absorber 1216 may include an absorber base 1214 and an absorber protrusion 1215. The fluid absorber 1216 any of the features of the fluid absorber 1116 described above. In some embodiments, the fluid absorber 1216 may be attached to or molded with the absorber retainer 1248. Furthest away from the hinge 1211 on the guard head 1208, a guard flange 1212 may be provided. The guard flange 1212 may include one or more features of the guard flange 1112 described above. The guard flange 1212 may extend beyond an outer perimeter of the guard body 1206 in a closed configuration. This may aid a user in opening the guard head 1208.

In some embodiments, the guard head 1208 includes a fastening element 1224. The fastening element 1224 may be a raised portion relative to a body of the guard head 1208 that is configured to couple with the aperture rim 1226. For example, the fastening element 1224 may contact and create a friction fit with a portion (e.g., distal portion) of the aperture rim 1226. Additionally or alternatively, the fastening element 1224 may include a curved profile, as shown, to better couple with the aperture rim 1226 in the closed position. In some configurations, the fastening element 1224 also can help improve the fluid resistant connection between the guard head 1208 and the guard body 1206.

Additionally or alternatively, the guard head 1208 may include one or more guard ears 1276 that at least partially surround the fluid absorber 1216 and/or may extend outward from the guard head 1208. The one or more guard ears 1276 may be shaped to receive and/or support the fluid absorber 1216. For example, as shown, the one or more guard ears 1276 can have a curvature that is substantially the same as a curvature of the absorber base 1214. The one or more guard ears 1276 may be configured to fit at least partially within a lock shell of the lock. In some embodiments the one or more guard ears 1276 comprises two guard ears 1276 disposed generally opposite each other, as shown in FIG. 17.

Additionally or alternatively, the locking device fluid guard 1204 may include one or more ribs 1278 that extend radially from the one or more guard ears 1276 and/or extend toward the absorber base 1214. The ribs 1278 may be configured to support and/or retain the fluid absorber 1216. For example, the ribs 1278 may create a friction interface with the fluid absorber 1216 (e.g., the absorber base 1214). The friction interface can promote coupling of the locking device fluid guard 1204 to the fluid absorber 1216.

Figure 18:
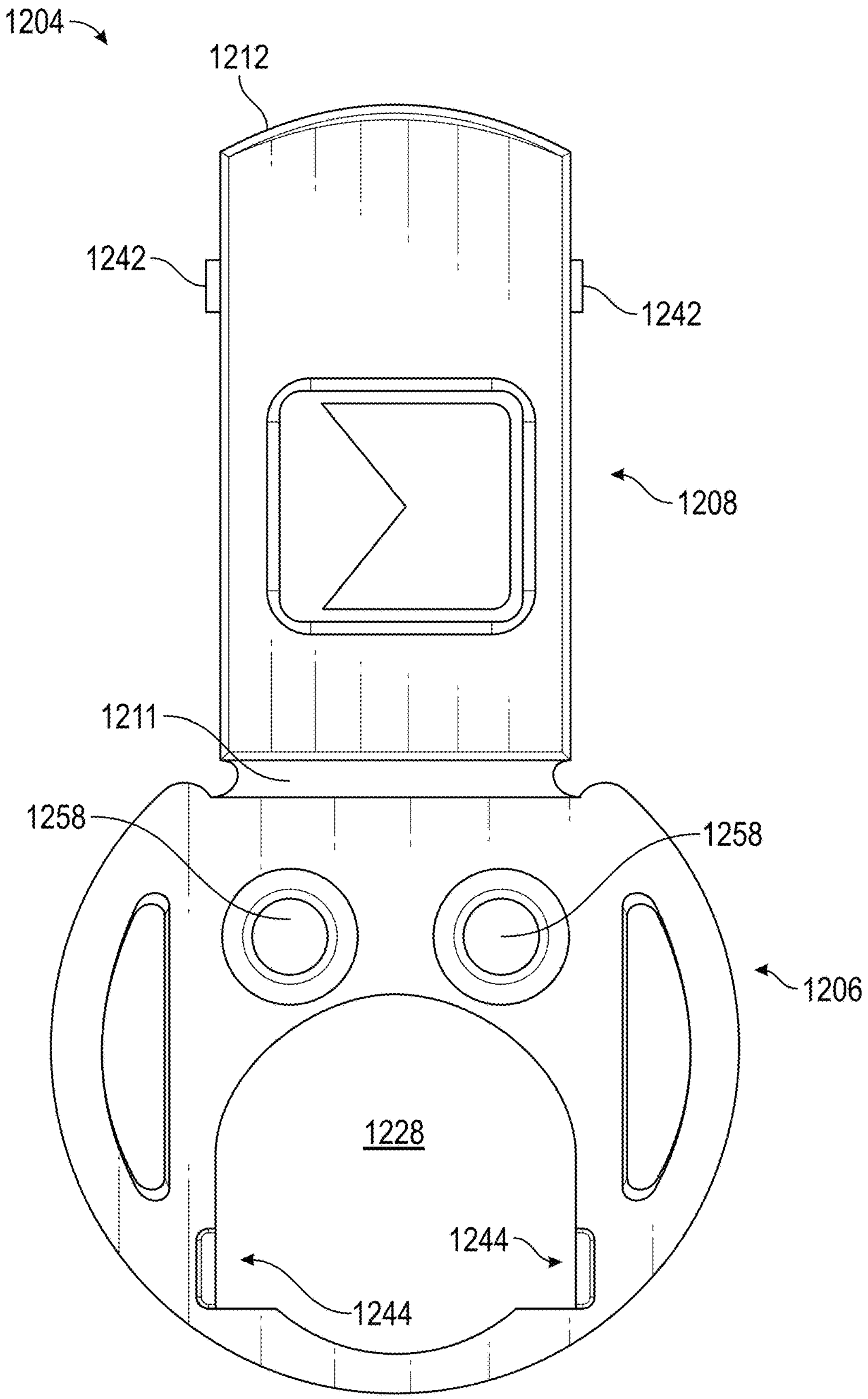
FIG. 18 shows a back view of the example locking device fluid guard of FIG. 17.

FIG. 18 shows a back view of the example locking device fluid guard 1204 of FIG. 17. The coupling elements 1242 can be seen to extend laterally from the guard head 1208. Other features can be seen in more detail and/or from the back perspective.

FIG. 19 shows a front view of the example locking device fluid guard 1204 of FIG. 17 coupled to the lock shell 1232. The retaining elements 1256 can be seen to couple the locking device fluid guard 1204 relative to the lock face 1264 of the lock. The fluid absorber 1216 can couple with and/or fit at least partially into a lock cup 1268 of the lock when the guard head 1208 is positioned in the closed position. One or more features of the interface between the fluid absorber 1116 and the lock cup 1168 may apply to the interface between the fluid absorber 1216 and the lock cup 1268. The absorber base 1214 can protect and/or cover at least a portion of an exterior annulus of a portion of the lock core 1220. The absorber base 1214 can mate with (e.g., be inserted into) the lock cup 1268 of the lock core 1220.

Figure 20:
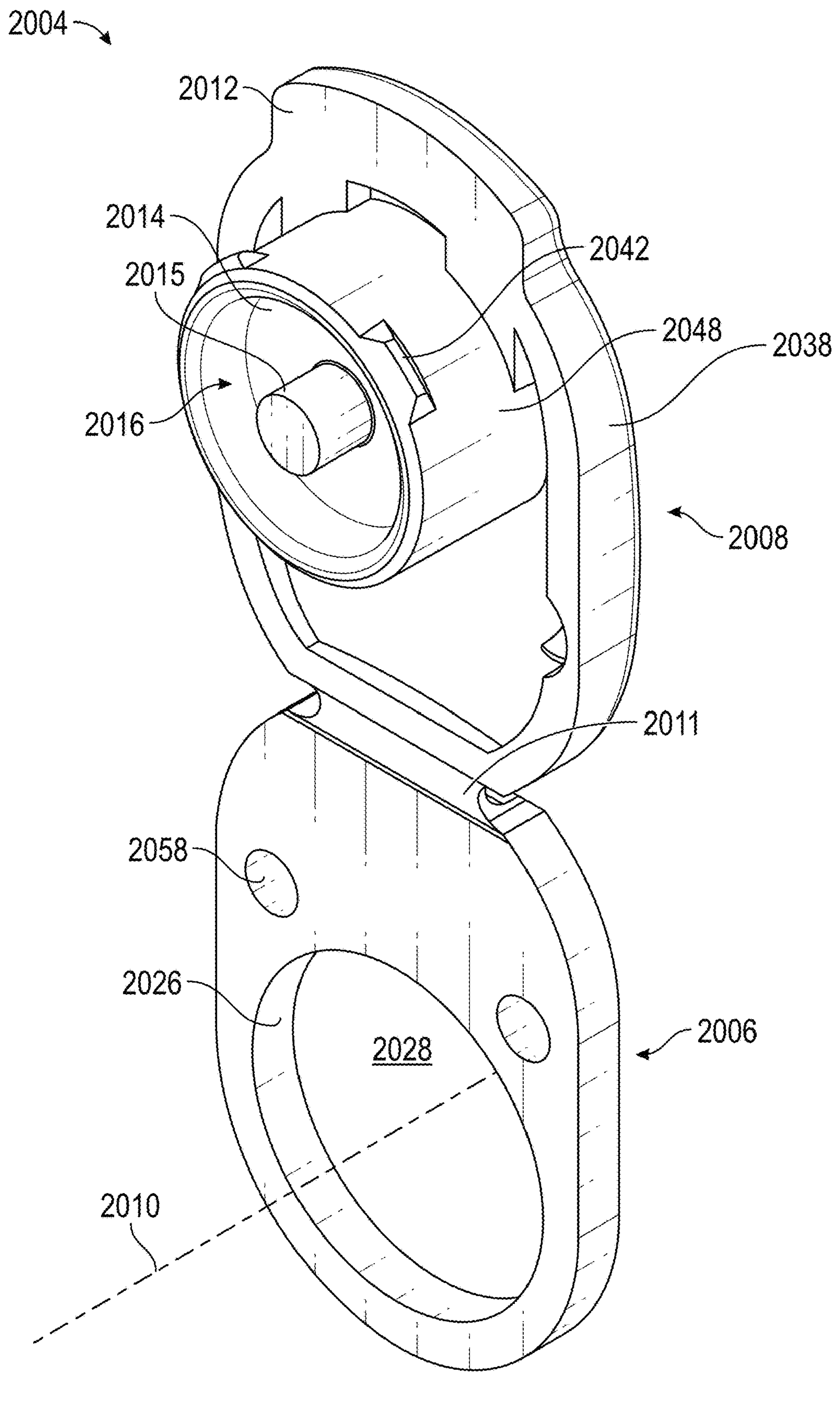
FIG. 20 shows a front perspective view of another example locking device fluid guard that can be installed on a locking device, according to some embodiments.
Figure 27:
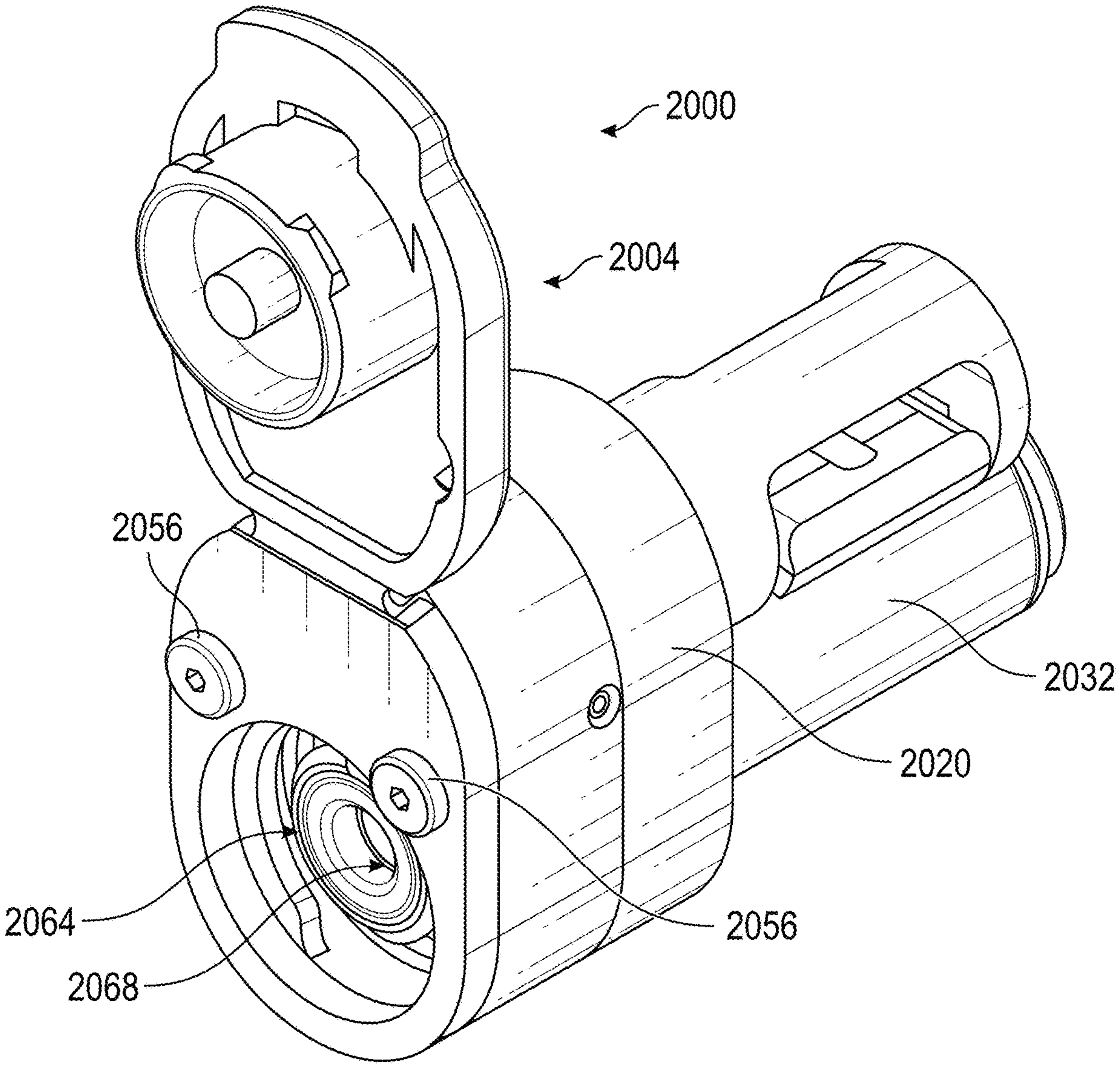
FIG. 27 shows a front perspective view of an example locking device assembly including the locking device fluid guard, according to some embodiments.

FIG. 20 shows a front perspective view of another example locking device fluid guard 2004 that can be installed on a locking device, according to some embodiments. The locking device fluid guard 2004 together with the fluid absorber 2016 can block fluids and/or remove or reduce the likelihood of fluid on the lock face 2064 (FIG. 27).

As shown, the locking device fluid guard 2004 is in an open position. The locking device fluid guard 2004 can include a guard body 2006 and a corresponding guard head 2008. As shown, for example, the locking device fluid guard 2004 may be generally rectangular with rounded corners. Other shapes are possible, such as those described above. The guard body 2006 and guard head 2008 may each be square, oval, round, or otherwise differently shaped than shown here. The guard head 2008 may be shaped and/or otherwise configured to fit at least partially within and/or be flush with the guard body 2006 in a closed configuration. For example, head walls 2038 of the guard head 2008 may be configured to be flush with the guard body 2006. A hinge 2011 can connect the guard body 2006 and the guard head 2008. The hinge 2011 may include one or more features of the hinge 1211 described above.

To close the locking device fluid guard 2004, one or more coupling elements 2042 on the guard head 2008 can mate with (for example, be inserted into, snap fit with, friction fit with, or the like) corresponding one or more coupling receivers of the guard body 2006. In some embodiments the coupling receivers may be simply be part of the guard body 2006. The coupling elements 2042 can include a cantilevered portion or other ledge (for example, sloped ledge) of the absorber retainer 2048, as shown. The one or more coupling elements 2042 may be coupled to (e.g., attached, molded with) corresponding one or more sides of the absorber retainer 2048, as shown. Preferably, the coupling elements 2042 and/or the coupling receives 2044 are configured such that they can join as discussed above but also can be separated from each other to reopen the locking device fluid guard following being closed. Other mechanisms can be used to close the locking device fluid guard 2004, such as those described above with regard to the locking device fluid guard 1204. Additionally or alternatively, one or more components of the locking device fluid guard 2004 may include materials described above with regard to the locking device fluid guard 1204.

The coupling elements 2042 may be disposed nearer to an end of the guard head 2008 than to the hinge 2011, such as shown. Such a configuration may enable the coupling elements 2042 to better secure the guard head 2008 in the closed position.

As discussed above, the guard head 2008 may include one or more head walls 2038. The head walls 2038 can provide some rigidity to the guard head 2008. The head walls 2038 also can help create a fluid seal along one or more sides of the lock and/or the face of the lock. In some embodiments, the head walls 2038 may be curved (for example, to align with the shape of the lock or the locking device fluid guard 2004). Other orientations and shapes are possible. For example, the walls may be disposed on the guard body 2006 in some embodiments, such as described herein.

The example guard body 2006 shown includes a guard aperture 2028. The guard aperture 2028 may allow insertion of a key therethrough (for example, the electronic key 650 described above) or can receive the proximal end of the lock core. In some embodiments, the guard aperture 2028 is approximately circular, though other shapes (for example, rectangular, elliptical, etc.) are possible. The guard aperture 2028 may be defined by and surrounded at least in part or in full by an aperture rim 2026, as shown. Other aspects of the guard body 2006 may include one or more features of the guard body 1206 described above. The guard aperture 2028 may define an assembly axis 2010 as shown. The assembly axis 2010 may share one or more features of the assembly axis 1210 described above. One or more retaining apertures 2058 may be disposed within the guard body 2006 to allow corresponding one or more retaining elements 2056 (see FIG. 27) to pass therethrough. The one or more retaining apertures 2058 may be disposed between the hinge 2011 and the guard aperture 2028. Other locations of the one or more guard aperture 2028 are possible.

The guard aperture 2028 may be configured to receive an absorber retainer 2048 therethrough. The absorber retainer 2048 may be disposed on the guard head 2008 and/or may be configured to couple with the guard body 2006 in a closed configuration. The absorber retainer 2048 can be a raised portion relative to a surface of the guard head 2008. For example, the absorber retainer 2048 may include a raised rim that fits within the aperture rim 2026 and/or the guard aperture 2028. The absorber retainer 2048 may include one or more features of the absorber retainer 1248 described above.

The absorber retainer 2048 can house the fluid absorber 2016. In some embodiments the absorber retainer 2048 extends along the assembly axis 2010 beyond the absorber base 2014 and/or the absorber protrusion 2015. Such an arrangement may further improve the retention of the fluid absorber 2016 and/or may improve fluid absorption or fluid redirection. The fluid absorber 2016 can advantageously wipe, absorb or otherwise wick away fluids from the lock face 2064. The fluid absorber 2016 may include an absorber base 2014 and an absorber protrusion 2015. The fluid absorber 2016 any of the features of the fluid absorber 1216 described above. The locking device fluid guard 2004 can include a guard flange 2012, which may include one or more features of the guard flange 1220 described above. For example, the guard flange 2012 may extend beyond an outer perimeter of the guard body 2006 in a closed configuration. This may aid a user in opening the guard head 2008.

Figure 21:
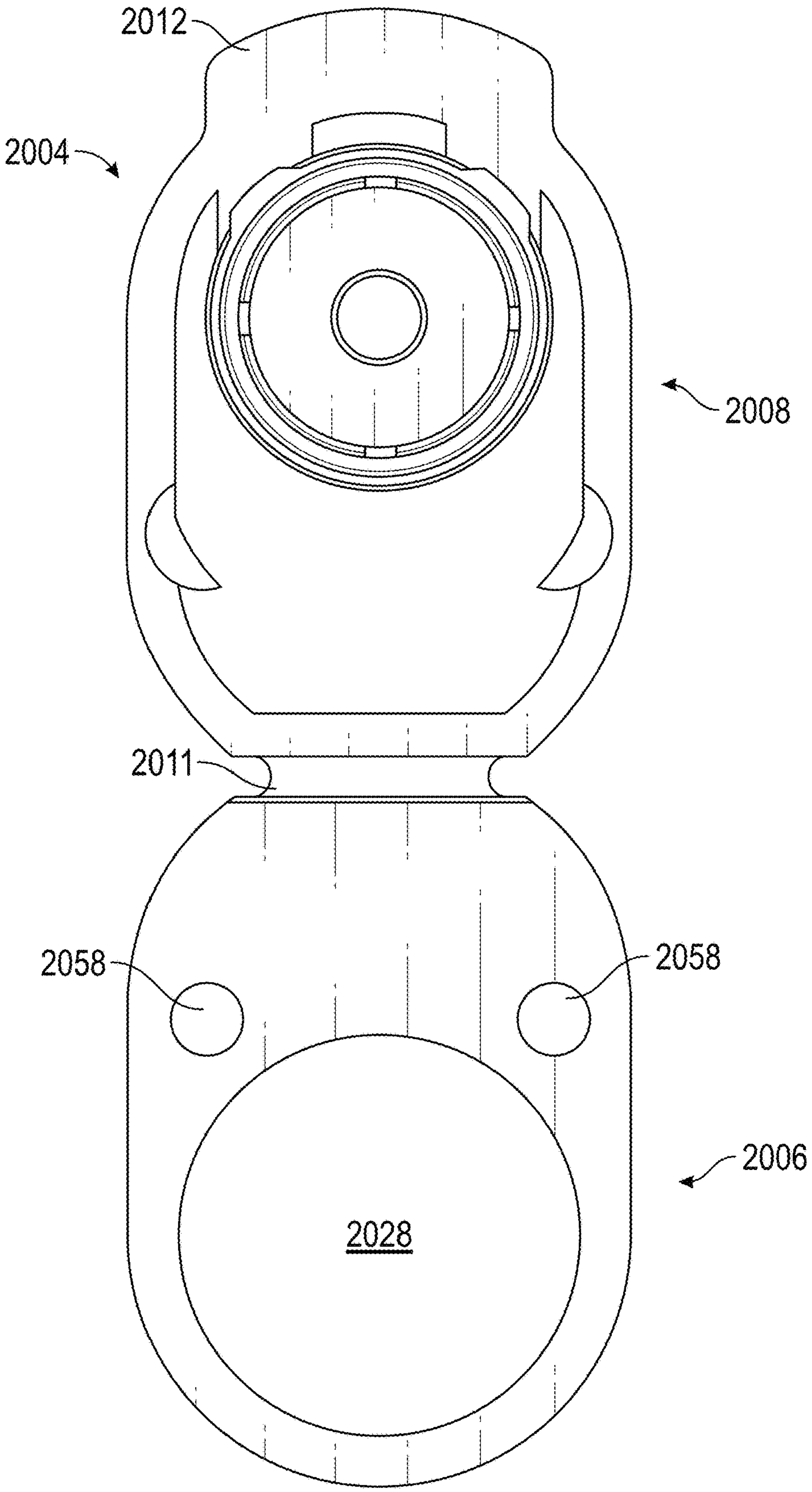
FIG. 21 shows a front view of the locking device fluid guard of FIG. 20.
Figure 22:
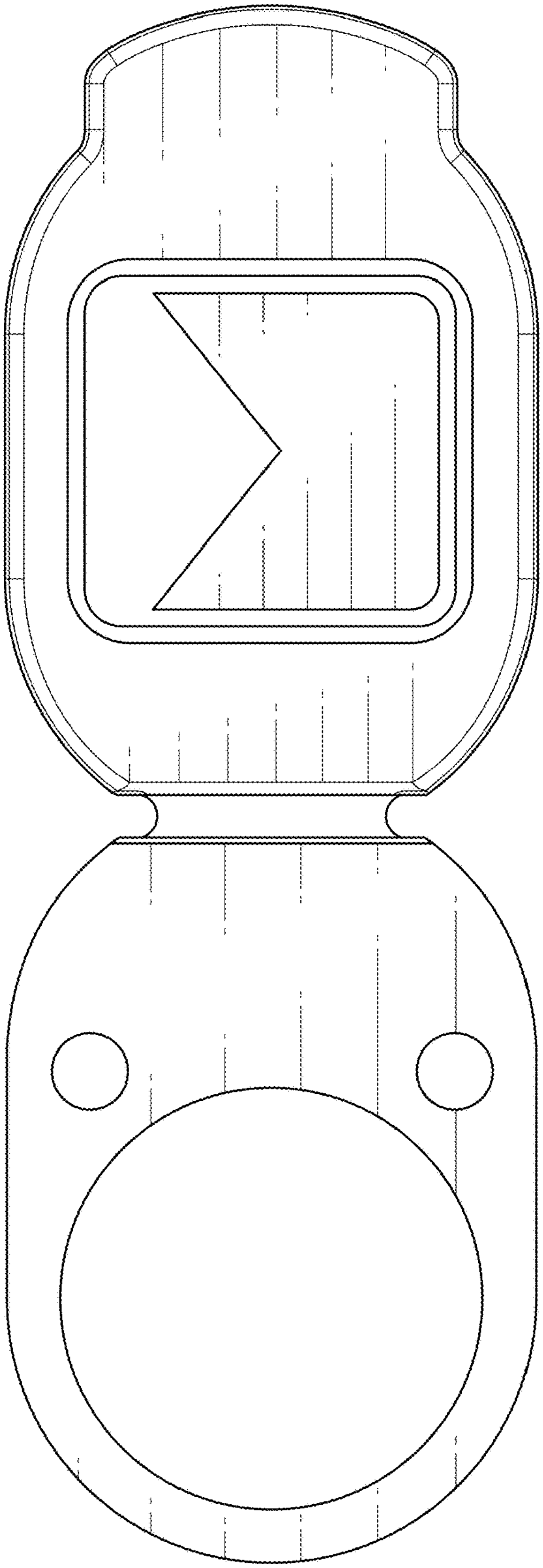
FIG. 22 shows a back view of the locking device fluid guard of FIG. 20.
Figure 23:
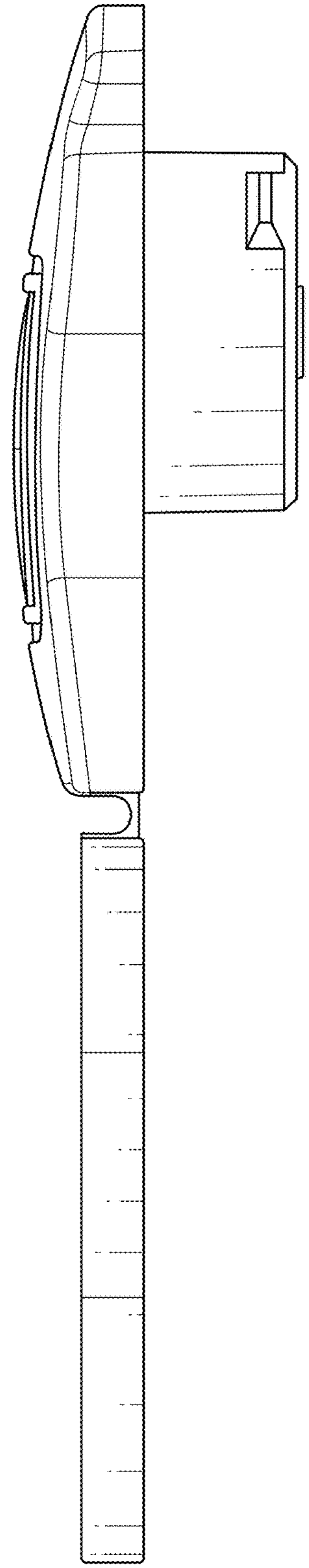
FIG. 23 shows a left view of the locking device fluid guard of FIG. 20.
Figure 24:
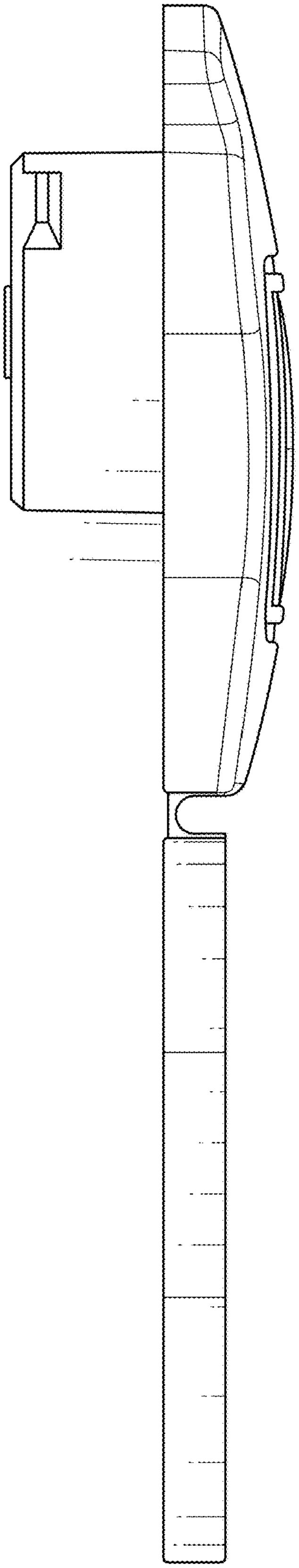
FIG. 24 shows a right view of the locking device fluid guard of FIG. 20.
Figure 25:
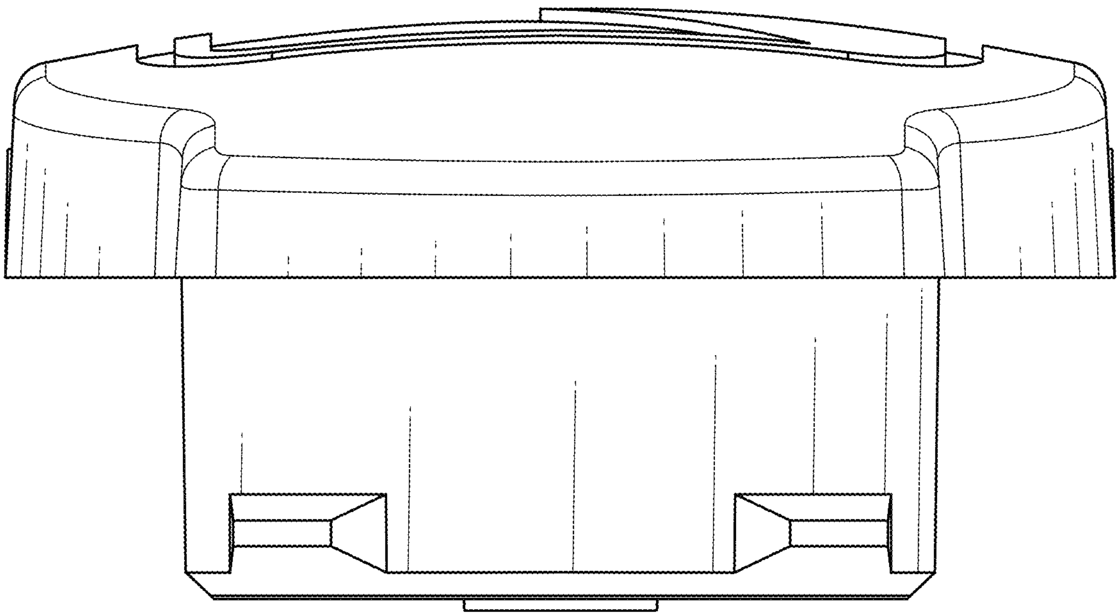
FIG. 25 shows a top view of the locking device fluid guard of FIG. 20.
Figure 26:
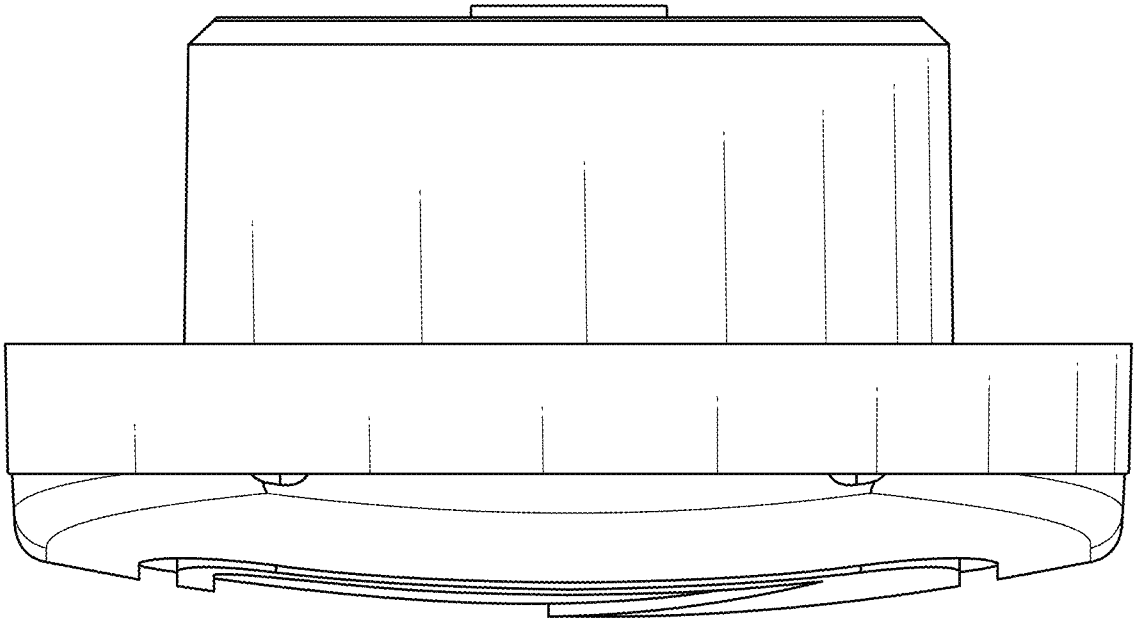
FIG. 26 shows a bottom view of the locking device fluid guard of FIG. 20.

FIGS. 21-26 show various views of the locking device fluid guard 2004 shown in FIG. 20. FIG. 21 shows a front view of the locking device fluid guard 2004. FIG. 22 shows a back view thereof. FIG. 23 shows a left side view thereof. FIG. 24 shows a right side thereof. FIG. 25 shows a top view thereof. FIG. 26 shows a bottom view thereof.

FIG. 27 shows a front perspective view of an example locking device assembly 2000 including the locking device fluid guard 2004, according to some embodiments. The locking device assembly 2000 can include the locking device fluid guard 2004, a lock shell 2032, a lock core (not shown), and/or a spacer 2020. The lock shell may house the lock core. The lock shell 2032 may generally extend along the assembly axis 2010 from the locking device fluid guard 2004. The spacer 2020 may create a separation distance between a proximal end of the locking device fluid guard 2004 and a distal end of the lock shell 2032. It may be advantageous, for example, to create a separation between the locking device fluid guard 2004 and one or more components of the locking device fluid guard 2004 and/or an attachment surface. For example, the spacer 2020 may allow the locking device assembly 2000 to better fit various fixtures. Additionally or alternatively, the spacer 2020 may allow for more or less accessibility of the lock core, depending on the target application of the locking device assembly 2000. The locking device assembly 2000 may include one or more features of the arrangement shown in e and/or in FIG. 13.

Figure 28:
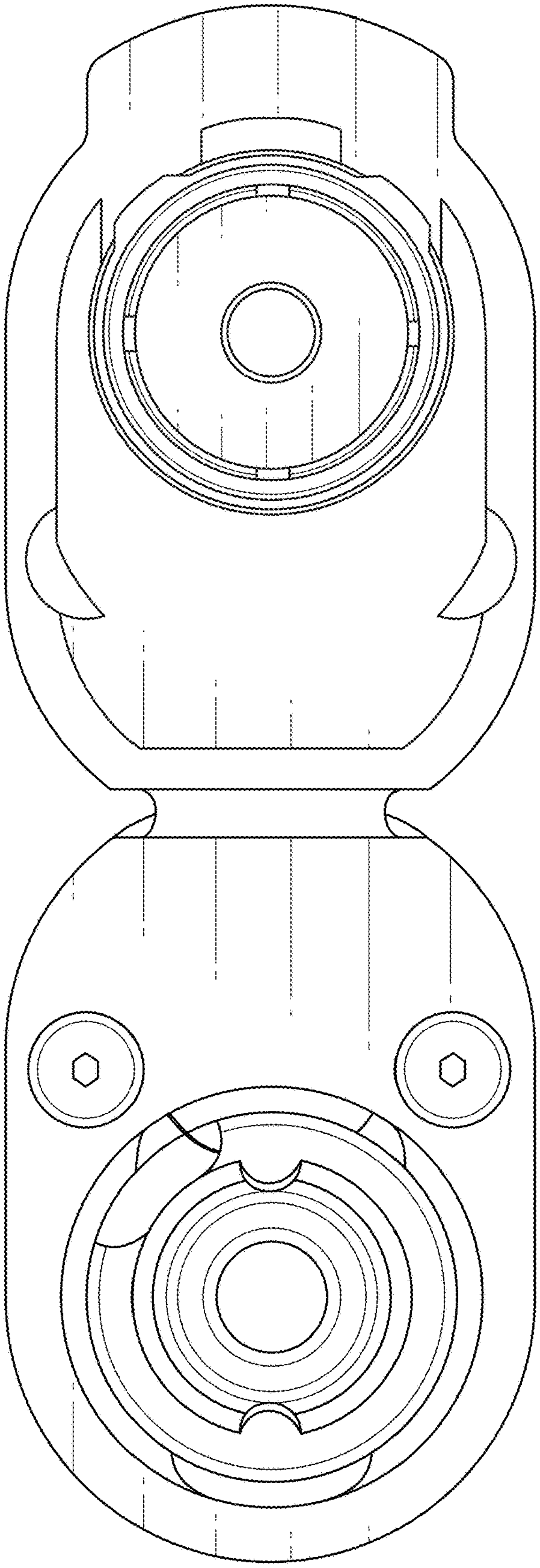
FIG. 28 shows a front view of the locking device fluid guard of FIG. 27.
Figure 29:
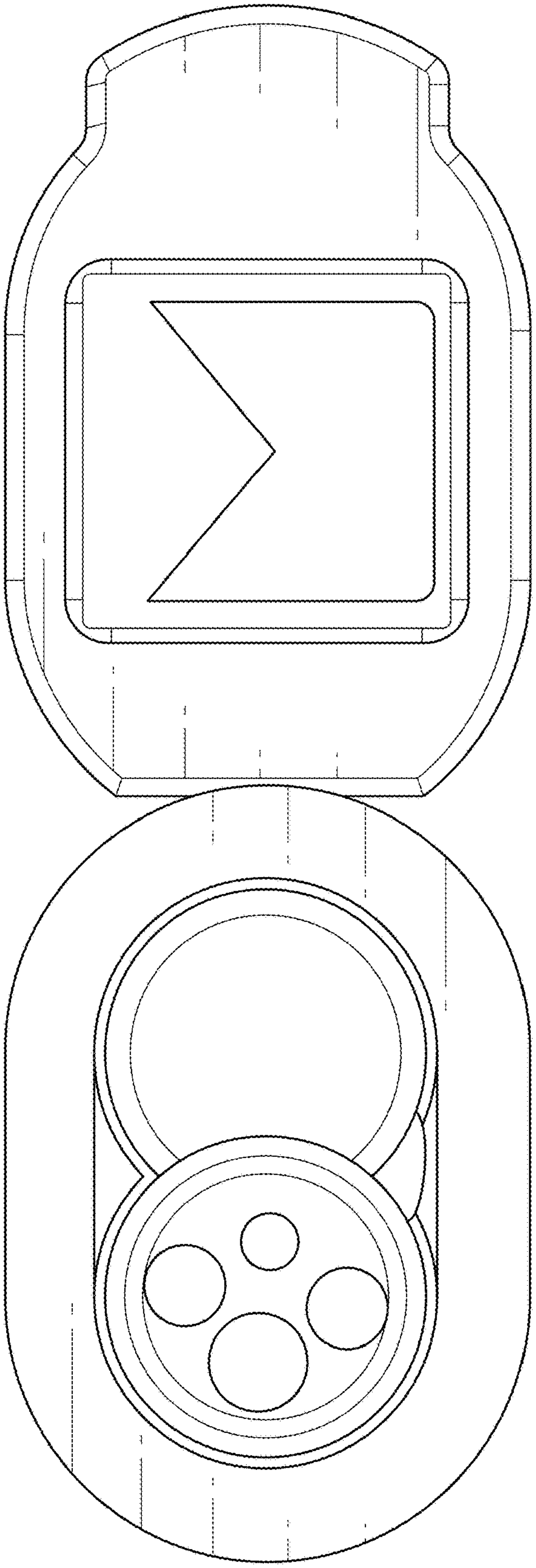
FIG. 29 shows a back view of the locking device fluid guard of FIG. 27.
Figure 30:
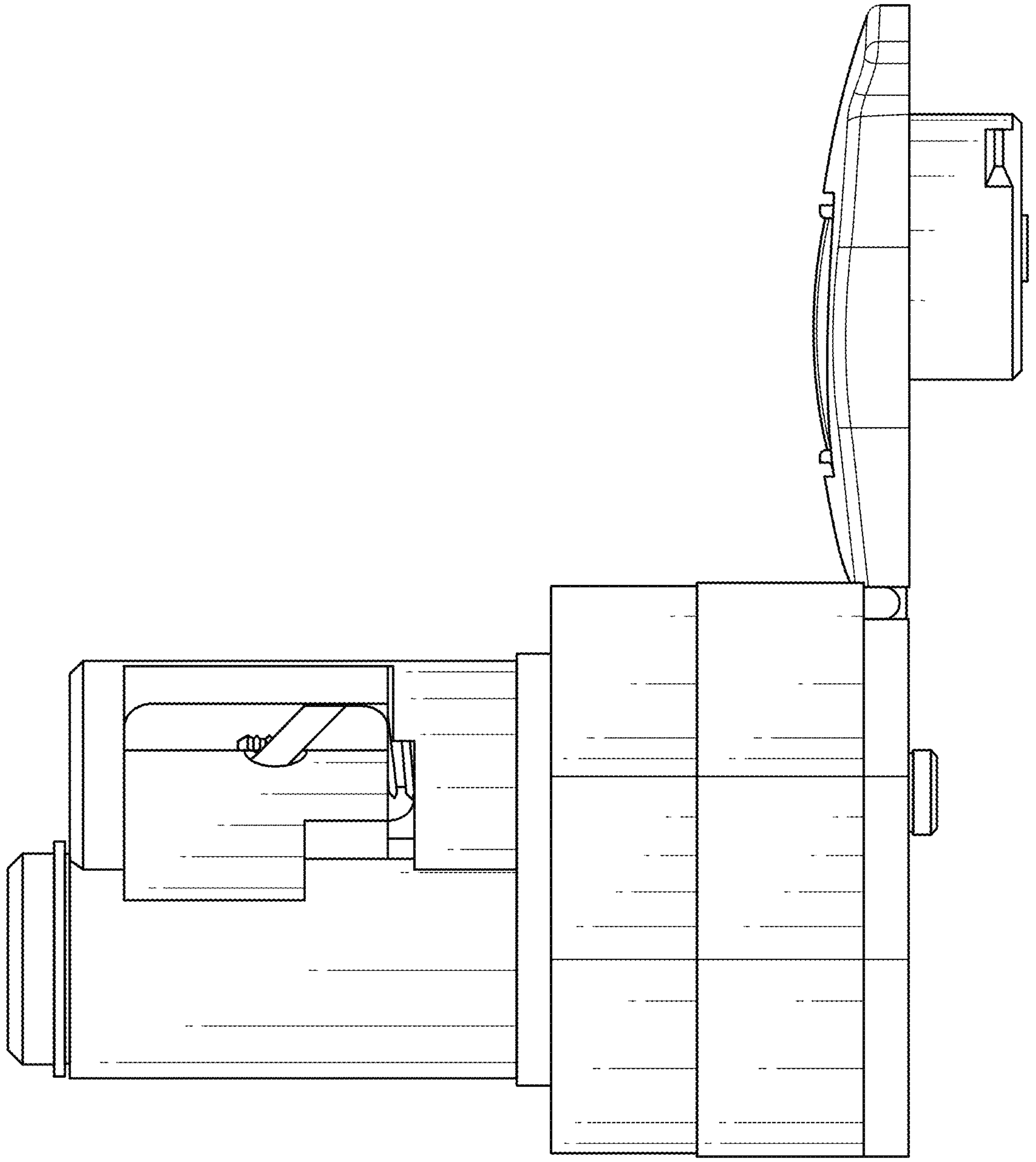
FIG. 30 shows a left view of the locking device fluid guard of FIG. 27.
Figure 31:
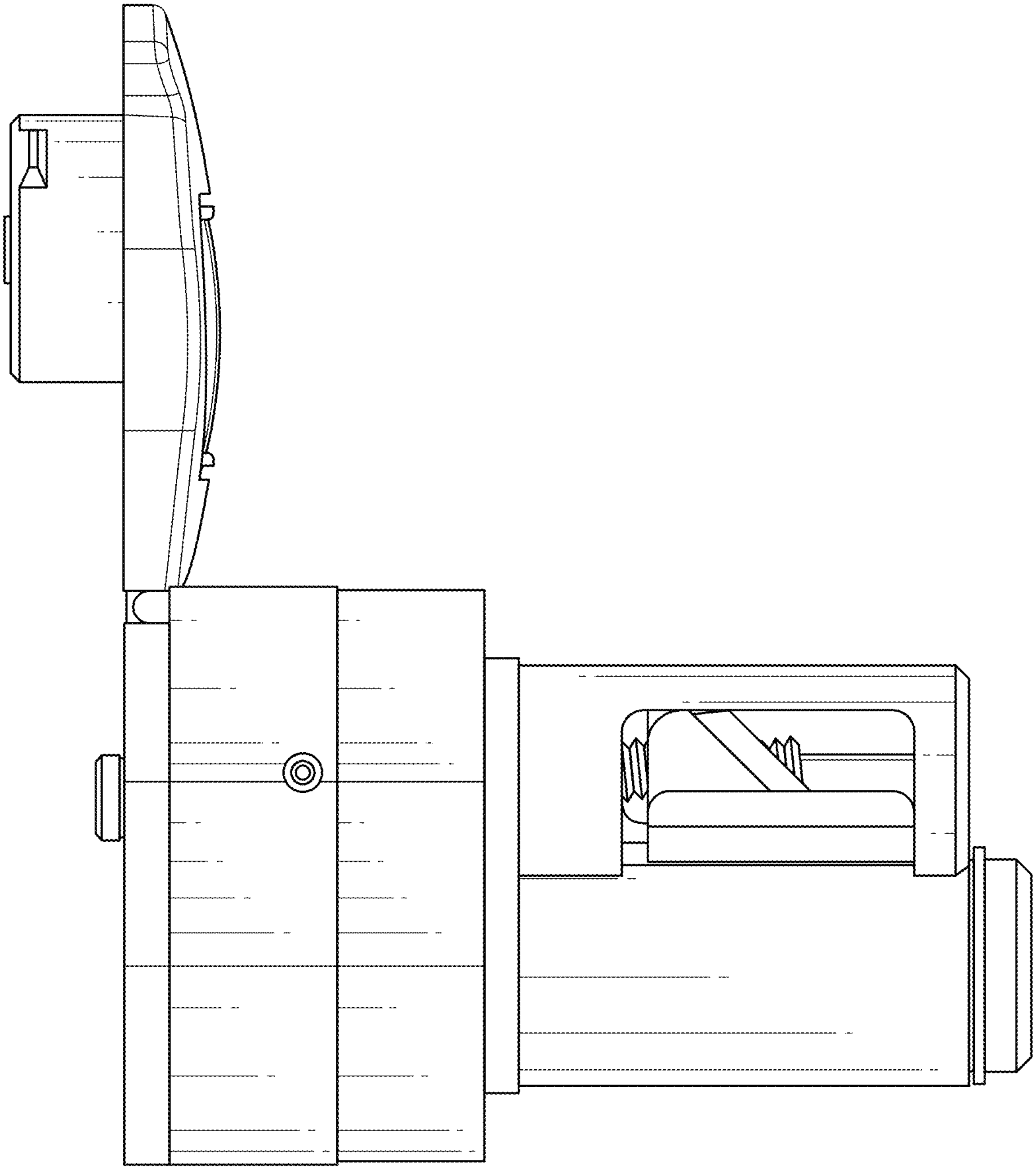
FIG. 31 shows a right view of the locking device fluid guard of FIG. 27.
Figure 32:
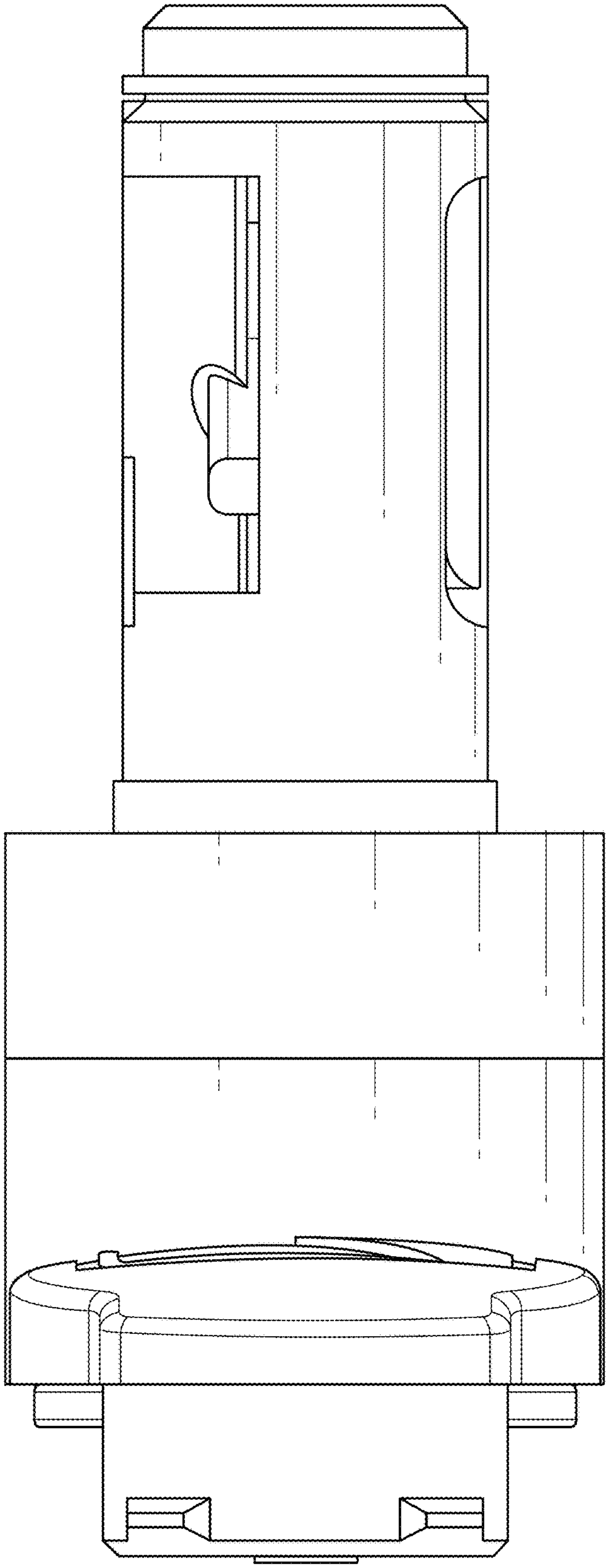
FIG. 32 shows a top view of the locking device fluid guard of FIG. 27.
Figure 33:
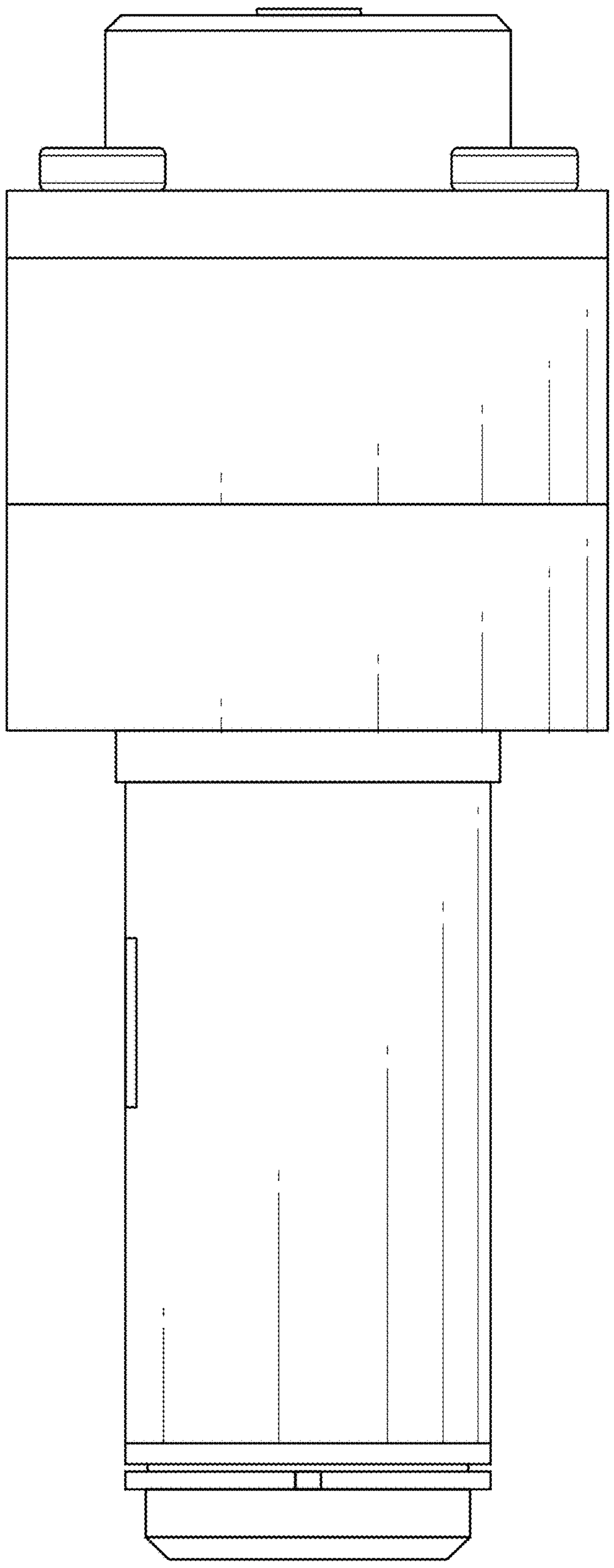
FIG. 33 shows a bottom view of the locking device fluid guard of FIG. 27.

FIGS. 28-33 show various views of the locking device assembly 2000 shown in FIG. 20. FIG. 28 shows a front view of the locking device assembly 2000. FIG. 29 shows a back view thereof. FIG. 30 shows a left side view thereof. FIG. 31 shows a right side thereof. FIG. 32 shows a top view thereof. FIG. 33 shows a bottom view thereof.

EXAMPLES

The following examples are meant by way of example only and are not limiting to the number of other available alternatives.

In a 1st example, a locking device guard comprises: a guard head comprising: a fluid absorber; a frame shaped to receive the fluid absorber; and a fastening mechanism; a guard body coupled with an electronic lock, the guard body comprising: an aperture configured to: expose a face of the electronic lock, and receive the fluid absorber; and a fastening receiver configured to mate with the fastening mechanism; a hinge connecting the guard head and the guard body and configured to define an open position and a closed position of the locking device guard.

In a 2nd example, the locking device guard of example 1, wherein the fluid absorber is configured to absorb at least 3 times its weight in fluid.

In a 3rd example, the locking device guard of any of examples 1-2, wherein the fluid absorber comprises a synthetic polymer.

In a 4th example, the locking device guard of any of examples 1-3, wherein the fluid absorber comprises polyvinyl alcohol.

In a 5th example, the locking device guard of any of examples 1-4, wherein the fluid absorber comprises an antimicrobial agent.

In a 6th example, the locking device guard of example 5, wherein the antimicrobial agent comprises silver.

In a 7th example, the locking device guard of any of examples 1-6, wherein the locking device guard comprises a resilient material.

In an 8th example, the locking device guard of any of examples 1-7, wherein the locking device guard comprises silicone.

In a 9th example, the locking device guard of any of examples 1-8, wherein the guard body further comprises a rim surrounding at least a portion of the aperture.

In a 10th example, the locking device guard of any of examples 1-9, wherein the guard head further comprises a fastening body that defines an air outlet, the air outlet providing fluid communication between an exterior of the locking device guard in a closed position and a locking device.

In an 11th example, the locking device guard of any of examples 1-10, wherein the locking device guard has a length and a width, the length being greater than the width.

In a 12th example, a locking device guard head comprising: a fluid absorber configured to: be inserted into a cup of a face of a lock, and absorb fluid from the face of the lock; a frame shaped to receive the fluid absorber; and a fastening mechanism; wherein the locking device guard head is configure to prevent a flow of fluid from an exterior of the guard head to the face of the lock.

In a 13th example, the locking device guard head of example 12, further comprising a hinge configured to connect to a guard body, the guard head configured to define an open position and a closed position.

In a 14th example, the locking device guard head of example 13, wherein fluid absorber is configured to fit into an aperture of the guard body.

In a 15th example, the locking device guard head of example 12, wherein the lock comprises an electronic lock.

In a 16th example, the locking device guard head of any of examples 12-15, wherein the fluid absorber comprises a synthetic polymer.

In a 17th example, the locking device guard head of any of examples 12-16, wherein the fluid absorber comprises polyvinyl alcohol.

In an 18th example, the locking device guard head of any of examples 12-17, wherein the fluid absorber comprises an antimicrobial agent.

In a 19th example, the locking device guard head of example 18, wherein the antimicrobial agent comprises silver.

In a 20th example, the locking device guard head of any of examples 12-19, wherein the locking device guard head comprises silicone.

In a 21st example, the locking device guard for use on an access panel of an access box, the locking device guard comprising: a latch of the access panel; a guard door attached to the latch of the access panel, the guard door comprising a fluid absorber; a guard base attached to the access panel of the access box, the guard base comprising: an aperture configured to: expose a face of an electronic lock disposed within the access panel; and receive the fluid absorber so as to permit the fluid absorber to contact the face of the electronic lock and to thereby permit absorption of fluid off of the face of the electronic lock; and a flange disposed at least partially about the aperture; and a hinge connecting the guard base and the guard door and configured to define an open position and a closed position of the locking device guard.

In a 22nd example, the locking device guard of example 21, wherein the guard door further comprises a door flange disposed at least partially about the fluid absorber.

In a 23rd example, the locking device guard of example 22, wherein the door flange is configured to guide fluid away from the fluid absorber.

In a 24th example, the locking device guard of any of examples 22-23, wherein the door flange is configured to fit at least partially within the aperture.

In a 25th example, the locking device guard of any of examples 22-24, wherein the door flange comprises a vent configured to allow, in the closed position, fluid communication between the fluid absorber and an exterior of the locking device guard.

In a 26th example, the locking device guard of any of examples 21-25, wherein the base flange comprises a vent configured to allow, in the closed position, fluid communication between the fluid absorber and an exterior of the locking device guard.

In a 27th example, the locking device guard of any of examples 21-26, wherein the guard door further comprises one or more fluid guides disposed at least partially along one or more edges of the guard door.

In a 28th example, the locking device guard of example 27, wherein the one or more fluid guides are configured to contact the guard base in the closed position.

In a 29th example, the locking device guard of any of examples 21-28, wherein the guard base further comprises a gasket configured to create a seal between the locking device guard and the face of the electronic lock.

In a 30th example, the locking device guard of example 29, wherein the gasket is disposed on a side opposite the base flange through the aperture.

In a 31st example, the locking device guard of any of examples 21-30, further comprising an adhesive.

In a 32nd example, the locking device guard of example 31, wherein the adhesive is disposed on a back surface of the locking device guard, the back surface being opposite a surface on which one or more of the fluid absorber or flange are disposed.

In a 33rd example, the locking device guard of any of examples 21-32, wherein the locking device guard comprises silicone.

In a 34th example, the locking device guard of any of examples 21-33, wherein the locking device guard comprises a material having a durometer of type A of between 25 and 35.

In a 35th example, the locking device guard of any of examples 21-34, wherein the fluid absorber comprises polyvinyl alcohol.

In a 36th example, the locking device guard of any of examples 21-35, wherein the fluid absorber comprises an antimicrobial agent.

In a 37th example, the locking device guard of example 36, wherein the antimicrobial agent comprises silver.

In a 38th example, the locking device guard of any of examples 21-37, wherein the locking device guard comprises a resilient material.

In a 39th example, the locking device guard of any of examples 21-38, wherein the base has a length and a width, the length being less than 50% greater than the width.

In a 40th example, the locking device guard of any of examples 21-39, wherein one or both of the flange or door flange comprise a curved profile forming an ear configured to guide fluid flow therein.

In a 41st example, the locking device guard of any of examples 21-40, wherein the access box comprises a storage container configured to secure supplies usable by first responders.

In a 42nd example, the locking device guard of any of examples 21-40, wherein the access box comprises a key access port for control of a gate.

In a 43rd example, the locking device guard of any of examples 1-11, wherein the locking device guard is configured for attachment to a padlock.

In a 44th example, the locking device guard of any of examples 1-11 or 43, wherein the locking device guard is configured for attachment to a lock box.

In a 45th example, the locking device guard of any of examples 1-11 or 43-44, wherein the fluid absorber is axially symmetric about an absorber axis.

In a 46th example, the locking device guard of any of examples 1-10 or 43-45, wherein the fluid absorber is shaped to conform to the face of the electronic lock.

In a 47th example, the locking device guard of any of examples 1-10 or 43-46, wherein a shape of the fluid absorber comprises a disk.

In a 48th example, the locking device guard of any of examples 1-10 or 43-47, wherein the fluid absorber is configured to enter an interior cup of the electronic lock.

In a 49th example, the locking device guard of any of examples 1-10 or 43-48, wherein the fastening mechanism comprises a ledge configured to mate with a corresponding ledge of the guard body.

In a 50th example, the locking device guard of any of examples 1-10 or 43-49, wherein the fastening mechanism is disposed near a distal end of the guard head in relation to the hinge.

In a 51st example, the locking device guard of any of examples 1-10 or 43-50, wherein the aperture is configured to receive the fluid absorber so as to permit the fluid absorber to contact the face of the electronic lock and to thereby permit absorption of fluid off of the face of the electronic lock.

In a 52nd example, a locking device fluid guard comprising: a guard body comprising a disc shape, the guard body configured to at least partially cover a face of an electronic lock in a closed configuration and to at least partially uncover the lock face of the electronic lock in an open configuration; a fluid absorber shaped to generally define a first axis and to fit within a recess of the guard body, the fluid absorber configured to fit at least partially within a cup of the lock face in the closed configuration, the fluid absorber comprising a generally cylindrical protruding portion and an annular portion at least partially surrounding the protruding portion; and a coupling protrusion configured to extend from the disc shape of the guard body and configured to fit within a cavity of the lock, the coupling protrusion shaped to define a second axis generally parallel to the first axis, the coupling protrusion configured to allow the guard body to be translated along the second axis and in an open configuration to uncover the fluid absorber from the at least the portion of the lock face and to withdraw the fluid absorber at least partially from within the cup of the lock face, the coupling protrusion configured to allow the guard body to rotate about the second axis.

In a 53rd example, the locking device guard of example 52, further comprising at least one ear extending from the disc shape of the guard body, the at least one ear configured to at least partially surround the lock face.

In a 54th example, the locking device guard of example 53, wherein the at least one ear is further configured to create a friction interface with the lock face, the friction interface configured to promote coupling of the guard body to the lock.

In a 55th example, the locking device guard of any of examples 53-54, wherein the guard body further comprises a recess configured to receive at least a portion of the fluid absorber therein.

In a 56th example, the locking device guard of example 55, wherein the guard body further comprises one or more projections projecting into the recess, the projections configured to create a friction interface with the fluid absorber, the friction interface configured to promote retention of the annular portion of the fluid absorber within the recess.

In a 57th example, the locking device guard of example 56, wherein the at least one ear is shaped to form a curve having a generally common curvature with the recess.

In a 58th example, the locking device guard of any of examples 52-57, wherein the coupling protrusion comprises a neck narrower than surrounding portions of the coupling protrusion.

In a 59th example, the locking device guard of any of examples 52-58, wherein the neck is shaped to mate with one or more retaining elements configured to restrict an amount of movement of the guard body along the first axis with respect to the lock.

In a 60th example, the locking device guard of any of examples 52-59, further comprising a flange extending from the disc shape of the guard body, the flange configured to promote manual manipulation of the guard body.

In a 61st example, the locking device guard of any of examples 52-60, wherein the fluid absorber is configured to absorb at least 3 times its weight in fluid.

In a 62nd example, the locking device guard of any of examples 52-61, wherein the fluid absorber comprises a synthetic polymer.

In a 63rd example, the locking device guard of any of examples 52-62, wherein the guard body comprises a thermoplastic elastomer (TPE).

In a 64th example, the locking device guard of example 63, wherein the TPE comprises a thermoplastic polyurethane (TPU).

In a 65th example, the locking device guard of any of examples 52-64, wherein the fluid absorber comprises an antimicrobial agent.

In a 66th example, the locking device guard of example 65, wherein the antimicrobial agent comprises silver.

In a 67th example, the locking device guard of any of examples 52-66, wherein the locking device guard comprises a resilient material.

In a 68th example, the locking device guard of any of examples 52-67, wherein the locking device guard comprises silicone.

In a 69th example, the locking device guard of any of examples 52-68, wherein a material of the locking device guard head has a durometer of between about 60 and 90.

In a 70th example, the locking device guard of any of examples 52-69, wherein a shape of the annular portion of the fluid absorber comprises a disk.

In a 71st example, the locking device guard of any of examples 52-70, wherein the fluid absorber is further configured in the closed configuration to cover at least a portion of a core of the lock.

In a 72nd example, a lock guard comprising: a guard cover configured to at least partially cover a face of a lock in a closed configuration; a fluid absorber shaped to generally define a first axis, the fluid absorber configured in a closed configuration to fit at least partially within a cup of the lock face; and a coupling element configured to couple the guard cover to the lock, the coupling element shaped to define a second axis generally parallel to the first axis, the coupling element configured to allow the guard cover to rotate about the second axis.

In a 73rd example, the locking device guard of example 72, wherein a shape of the guard cover comprises a disc shape.

In a 74th example, the locking device guard of any of examples 72-73, wherein the fluid absorber comprises a protruding portion and an annular portion at least partially surrounding the protruding portion.

In a 75th example, the locking device guard of any of examples 72-74, wherein the coupling element is configured to extend from the disc shape of the guard cover.

In a 76th example, the locking device guard of any of examples 72-75, wherein the coupling element is configured to allow the guard cover to be translated along the second axis and in an open configuration configured to uncover the fluid absorber from the at least the portion of the lock face and to withdraw the fluid absorber at least partially from within the cup of the lock face.

In a 77th example, the locking device guard of any of examples 72-76, further comprising at least one ear extending from the disc shape of the guard cover, the at least one ear configured to at least partially surround the lock face.

In a 78th example, the locking device guard of example 77, wherein the at least one ear is further configured to create a friction interface with the lock face, the friction interface configured to promote coupling of the guard cover to the lock.

In a 79th example, the locking device guard of example 78, wherein the guard cover further comprises a recess configured to receive at least a portion of the fluid absorber therein.

In an 80th example, the locking device guard of example 79, wherein the guard cover further comprises one or more projections projecting into the recess, the projections configured to create a friction interface with the fluid absorber, the friction interface configured to promote retention of an annular portion of the fluid absorber within the recess.

In an 81st example, the locking device guard of example 80, wherein the at least one ear is shaped to form a curve having a generally common curvature with the recess.

In an 82nd example, the locking device guard of any of examples 72-81, wherein the coupling element comprises a neck narrower than surrounding portions of the coupling element.

In an 83rd example, the locking device guard of any of examples 72-82, wherein the neck is shaped to mate with one or more retaining elements configured to restrict an amount of movement of the guard cover along the first axis with respect to the lock.

In an 84th example, the locking device guard of any of examples 72-83, further comprising a flange extending from the disc shape of the guard cover, the flange configured to promote manual manipulation of the guard cover.

In an 85th example, the locking device guard of any of examples 72-84, wherein the fluid absorber is configured to absorb at least 3 times its weight in fluid.

In an 86th example, the locking device guard of any of examples 72-85, wherein the fluid absorber comprises a synthetic polymer.

In an 87th example, the locking device guard of any of examples 72-86, wherein the guard body comprises a thermoplastic elastomer (TPE).

In an 88th example, the locking device guard of any of examples 87, wherein the TPE comprises a thermoplastic polyurethane (TPU).

In an 89th example, the locking device guard of any of examples 72-88, wherein the fluid absorber comprises an antimicrobial agent.

In a 90th example, the locking device guard of example 89, wherein the antimicrobial agent comprises silver.

In a 91st example, the locking device guard of any of examples 72-90, wherein the locking device guard comprises a resilient material.

In a 92nd example, the locking device guard of any of examples 72-91, wherein the locking device guard comprises silicone.

In a 93rd example, the locking device guard of any of examples 72-92, wherein a material of the locking device guard head has a durometer of between about 60 and 90.

In a 94th example, the locking device guard of any of examples 72-93, wherein a shape of an annular portion of the fluid absorber comprises a disk.

In a 95th example, the locking device guard of any of examples 72-94, wherein the fluid absorber is further configured in the closed configuration to cover at least a portion of a core of the lock.

In a 96th example, the locking device guard of any of examples 72-95, wherein the coupling element is configured to fit within a cavity of the lock.

In a 97th example, a locking device guard comprising: a guard head comprising a fluid absorber and a fastening mechanism; a guard body configured to couple with an electronic lock, the guard body comprising: an aperture configured to expose a face of the electronic lock and receive the fluid absorber therethrough; and a fastening receiver configured to mate with the fastening mechanism; and a hinge connecting the guard head and the guard body and configured to define an open position and a closed position of the locking device guard, wherein the guard head is configured to fit at least partially within guard walls of the guard body in the closed position.

Terminology

Although certain embodiments and examples are disclosed herein, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent.

Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. Furthermore, the particular features, structures or characteristics may be combined in any suitable manner, as would be apparent to one of ordinary skill in the art from this disclosure, in one or more embodiments.

As used in this application, the terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment. Accordingly, no feature or group of features is necessary or indispensable to each embodiment.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of any claims which follow should not be limited by the particular embodiments described above.

What is claimed is:

1. A locking device fluid guard comprising:

a guard body comprising a disc shape, the guard body configured to at least partially cover a lock face of an electronic lock in a closed configuration and to at least partially uncover the lock face of the electronic lock in an open configuration;

a fluid absorber shaped to generally define a first axis and to fit within a recess of the guard body, the fluid absorber configured to fit at least partially within a cup of the lock face in the closed configuration, the fluid absorber comprising a generally cylindrical protruding portion and an annular portion at least partially surrounding the protruding portion; and a coupling protrusion configured to extend from the disc shape of the guard body and configured to fit within a cavity of the lock, the coupling protrusion shaped to define a second axis generally parallel to the first axis, the coupling protrusion configured to allow the guard body to be translated along the second axis between a closed configuration and an open configuration and when in an open configuration to uncover the fluid absorber from the at least the portion of the lock face and to withdraw the fluid absorber at least partially from within the cup of the lock face, the coupling protrusion configured to allow the guard body to rotate about the second axis when in the open configuration, wherein the coupling protrusion comprises a neck narrower than surrounding portions of the coupling protrusion.

2. The locking device fluid guard of claim 1, further comprising at least one ear extending from the disc shape of the guard body, the at least one ear configured to at least partially surround the lock face.

3. The locking device fluid guard of claim 2, wherein the guard body further comprises a recess configured to receive at least a portion of the fluid absorber therein.

4. The locking device fluid guard of claim 3, wherein the guard body further comprises one or more projections projecting into the recess, the projections configured to create a friction interface with the fluid absorber, the friction interface configured to promote retention of the annular portion of the fluid absorber within the recess.

5. The locking device fluid guard of claim 4, wherein the at least one ear is shaped to form a curve having a generally common curvature with the recess.

6. The locking device fluid guard of claim 1, wherein the neck is shaped to mate with one or more retaining elements configured to restrict an amount of movement of the guard body along the first axis with respect to the lock.

7. The locking device fluid guard of claim 1, further comprising a flange extending from the disc shape of the guard body, the flange configured to promote manual manipulation of the guard body.

8. The locking device fluid guard of claim 1, wherein the fluid absorber comprises a synthetic polymer.

9. The locking device fluid guard of claim 1, wherein a material of the locking device guard head has a durometer of between about 50 and 90.

10. The locking device fluid guard of claim 1, wherein the fluid absorber is further configured in the closed configuration to cover at least a portion of a core of the lock.

11. A lock guard comprising:

a guard cover configured to at least partially cover a face of a lock in a closed configuration;

a fluid absorber shaped to generally define a first axis, the fluid absorber configured in a closed configuration to fit at least partially within a cup of the lock face; and a coupling element configured to couple the guard cover to the lock, the coupling element shaped to define a second axis generally parallel to the first axis, the coupling element configured to allow the guard cover to rotate about the second axis.

12. The lock guard of claim 11, wherein the coupling element is configured to allow the guard cover to be translated along the second axis and in an open configuration configured to uncover the fluid absorber from the at least the portion of the lock face and to withdraw the fluid absorber at least partially from within the cup of the lock face.

13. The lock guard of claim 11, further comprising at least one ear extending from the disc shape of the guard cover, the at least one ear configured to at least partially surround the lock face.

14. The lock guard of claim 13, wherein the guard cover further comprises a recess configured to receive at least a portion of the fluid absorber therein.

15. The lock guard of claim 14, wherein the guard cover further comprises one or more projections projecting into the recess, the projections configured to create a friction interface with the fluid absorber, the friction interface configured to promote retention of an annular portion of the fluid absorber within the recess.

16. The lock guard of claim 15, wherein the at least one ear is shaped to form a curve having a generally common curvature with the recess.

17. The lock guard of claim 11, further comprising a flange extending from the disc shape of the guard cover, the flange configured to promote manual manipulation of the guard cover.

18. The lock guard of claim 11, wherein the coupling element is configured to fit within a cavity of the lock.

19. A locking device guard comprising:

a guard head comprising:

an absorber retainer extending from a surface of the guard head, the absorber retainer comprising at least one coupling element; and a fluid absorber configured to be disposed within the absorber retainer; and a guard body configured to couple with an electronic lock, the guard body comprising:

an aperture configured to form a rim in the guard body, to expose a face of the electronic lock, and to receive at least a portion of the absorber retainer therethrough, wherein the at least one coupling element is configured to couple to the rim of the guard body; and a hinge connecting the guard head and the guard body and configured to define an open position and a closed position of the locking device guard.

20. A locking device fluid guard comprising:

a guard body comprising a disc shape, the guard body configured to at least partially cover a lock face of an electronic lock in a closed configuration and to at least partially uncover the lock face of the electronic lock in an open configuration;

a fluid absorber shaped to generally define a first axis and to fit within a recess of the guard body, the fluid absorber configured to fit at least partially within a cup of the lock face in the closed configuration, the fluid absorber comprising a generally cylindrical protruding portion and an annular portion at least partially surrounding the protruding portion;

a coupling protrusion configured to extend from the disc shape of the guard body and configured to fit within a cavity of the lock, the coupling protrusion shaped to define a second axis generally parallel to the first axis, the coupling protrusion configured to allow the guard body to be translated along the second axis between a closed configuration and an open configuration and when in an open configuration to uncover the fluid absorber from the at least the portion of the lock face and to withdraw the fluid absorber at least partially from within the cup of the lock face, the coupling protrusion configured to allow the guard body to rotate about the second axis when in the open configuration; and at least one ear extending from the disc shape of the guard body, the at least one ear configured to at least partially surround the lock face, wherein the guard body further comprises a recess configured to receive at least a portion of the fluid absorber therein, and wherein the guard body further comprises one or more projections projecting into the recess, the projections configured to create a friction interface with the fluid absorber, the friction interface configured to promote retention of the annular portion of the fluid absorber within the recess.

* * * * *